(12) United States Patent
Watanabe et al.

(10) Patent No.: US 9,053,075 B2
(45) Date of Patent: Jun. 9, 2015

(54) STORAGE CONTROL DEVICE AND METHOD FOR CONTROLLING STORAGES

(71) Applicant: FUJITSU LIMITED, Kawasaki-shi, Kanagawa (JP)

(72) Inventors: Takeshi Watanabe, Kawasaki (JP); Hidejirou Daikokuya, Kawasaki (JP); Kazuhiko Ikeuchi, Kawasaki (JP); Chikashi Maeda, Kawasaki (JP); Norihide Kubota, Kawasaki (JP); Atsushi Igashira, Yokohama (JP); Kenji Kobayashi, Kawasaki (JP); Ryota Tsukahara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 13/947,278

(22) Filed: Jul. 22, 2013

(65) Prior Publication Data

US 2014/0089730 A1    Mar. 27, 2014

(30) Foreign Application Priority Data

Sep. 26, 2012 (JP) .................................. 2012-213273

(51) Int. Cl.
*G06F 11/00* (2006.01)
*G06F 11/20* (2006.01)
*G06F 11/10* (2006.01)

(52) U.S. Cl.
CPC .... *G06F 11/2094* (2013.01); *G06F 2211/1059* (2013.01); *G06F 11/1092* (2013.01)

(58) Field of Classification Search
CPC .................................................. G06F 11/1092
USPC ............................ 714/6.22, 6.23, 6.3, 11–13
See application file for complete search history.

(56) References Cited

U.S. PATENT DOCUMENTS

| 5,941,993 | A  | * | 8/1999  | Tanaka et al. ................ 714/6.12 |
| 7,260,739 | B2 | * | 8/2007  | Burton et al. ................ 714/6.23 |
| 2002/0133741 | A1 | * | 9/2002  | Maeda et al. ..................... 714/7 |
| 2004/0225913 | A1 | * | 11/2004 | Hori ................................. 714/6 |
| 2004/0236986 | A1 | * | 11/2004 | Ng .................................... 714/7 |
| 2005/0102552 | A1 | * | 5/2005  | Horn ................................. 714/6 |
| 2006/0206753 | A1 |   | 9/2006  | Yamato et al. |

FOREIGN PATENT DOCUMENTS

| JP | 2002-108571 | 4/2002 |
| JP | 2006-252126 | 9/2006 |

* cited by examiner

*Primary Examiner* — Dieu-Minh Le
(74) *Attorney, Agent, or Firm* — Staas & Halsey LLP

(57) ABSTRACT

A processor copies first information stored in a first storage to a backup volume. The processor stores management information when a first piece of the first information is updated to second information after the copy. The processor executes, when a failure occurs in the first storage, first restoration based on the management information and reference information stored in reference storages other than the first storage. The first restoration restores the second information to a spare storage. The processor executes second restoration based on the management information and the reference information. The second restoration restores third information to the spare storage. The processor stops the second restoration when a failure occurs in a second storage while the second restoration is being executed. The processor executes third restoration based on the first information stored in the backup volume and the management information. The third restoration restores fourth information to the spare storage.

10 Claims, 18 Drawing Sheets

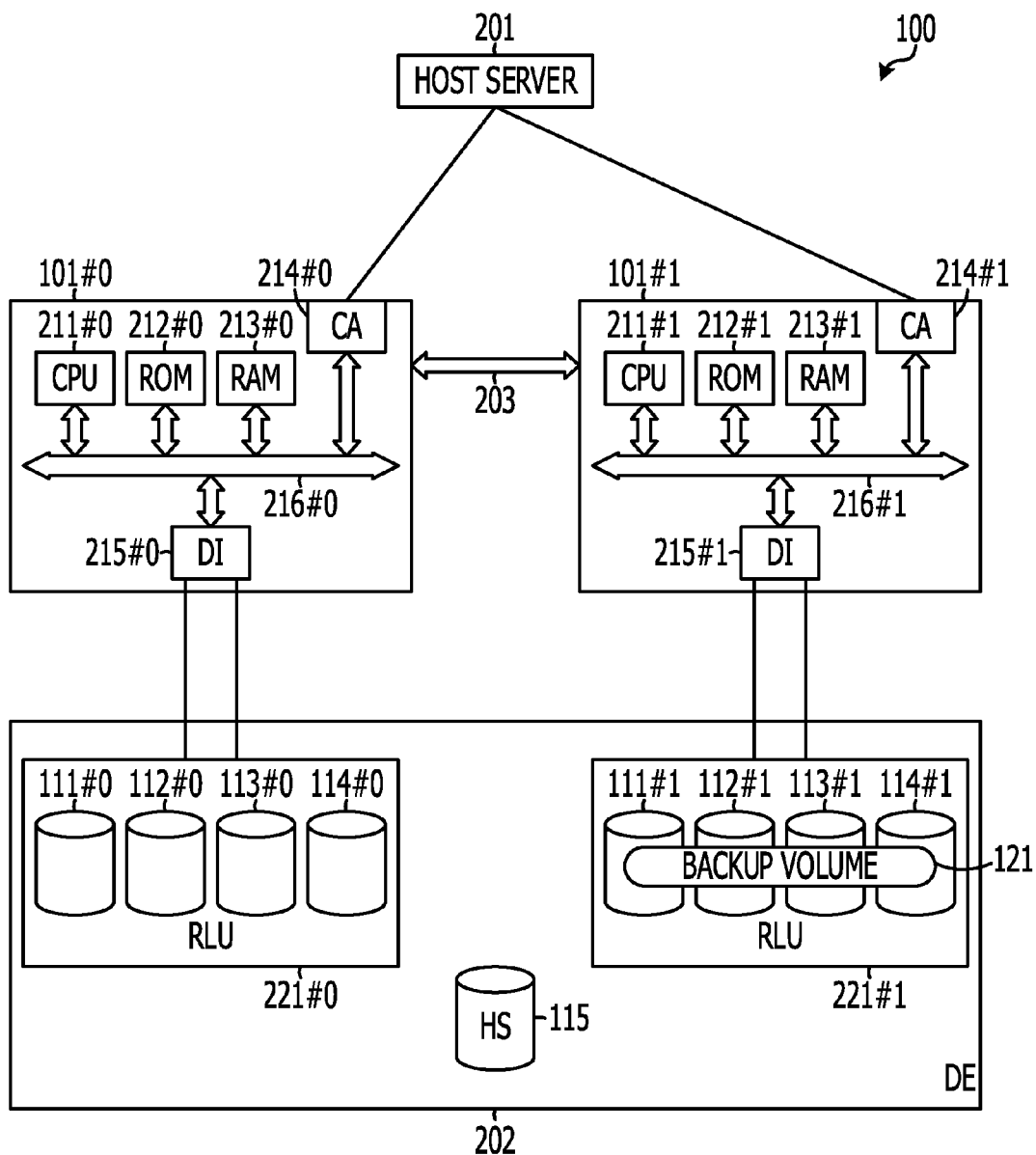

STORAGE CONTROL DEVICE AND METHOD FOR CONTROLLING STORAGES

CROSS-REFERENCE TO RELATED APPLICATION

This application is based upon and claims the benefit of priority of the prior Japanese Patent Application No. 2012-213273, filed on Sep. 26, 2012, the entire contents of which are incorporated herein by reference.

FIELD

The embodiments discussed herein are related to a storage control device and a method for controlling storages.

BACKGROUND

A technology called redundant arrays of inexpensive disks (RAID) has been proposed, in which a plurality of storages are combined and operated as a single virtual storage group, thereby improving redundancy. There is another technology in which a modification map that records an updated part of data updated after backup for a plurality of storages is provided and, when reconstructing data of a storage in which a failure has occurred, data in the updated part recorded in the modification map is reconstructed on the basis of data of other storages. Furthermore, there is still another technology in which a plurality of disks and a backup storage used for backup of data of the plurality of disks are provided and, when a faulty disk, among the plurality of disks, is replaced with another disk, data of the replacement disk is recovered from the backup storage.

Japanese Laid-open Patent Publication No. 2002-108571 and Japanese Laid-open Patent Publication No. 2006-252126 disclose related techniques.

However, according to related techniques, in the case where a failure has occurred in a storage of a storage group, if, while rebuilding processing of recovering the redundancy of the storage group is performed, a failure occurs in another storage of the storage group, it may be difficult to recover the storage group.

SUMMARY

According to an aspect of the present invention, provided is a storage control device including a memory and a processor. The processor copies all pieces of first information stored in a first storage to a backup volume. The processor stores management information in the memory when a first piece of the first information stored in the first storage is updated to second information after the copy. The management information includes position information indicating a stored position, in the first storage, of the first piece of the first information. The first storage is included in a storage group in which redundancy is maintained. The storage group includes a plurality of storages. The processor executes, when a first failure occurs in the first storage, first restoration on the basis of the management information stored in the memory and reference information stored in reference storages. The reference storages are the plurality of storages other than the first storage. The first restoration restores the second information stored at the stored position in the first storage to a spare storage other than the plurality of storages. The processor executes second restoration on the basis of the management information stored in the memory and the reference information stored in the reference storages. The second restoration restores third information to the spare storage. The third information is stored in the first storage and is other than the second information. The processor stops the second restoration when a second failure occurs in a second storage among the reference storages while the second restoration is being executed. The processor executes third restoration on the basis of the first information stored in the backup volume and the management information stored in the memory. The third restoration restores fourth information to the spare storage. The fourth information is stored in the first storage and is other than the second information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a hardware configuration example of a storage system;

DESCRIPTION OF EMBODIMENT

A storage control device and a method for controlling storages according to an embodiment will be hereinafter described in detail with reference to the accompanying drawings.

FIGS. 1A to 1D are diagrams illustrating operation examples of a storage control device according to this embodiment. A storage system 100 includes a storage control device 101, disks 111 to 114 that are to be controlled, and a backup volume 121.

Each of the disks 111 to 114 is a storage medium that stores data. A storage is a device that stores data. The storage includes a drive controller that controls a storage medium that is a disk. This embodiment will be described, for the sake of simplicity, on the assumption that a single disk is provided in a single storage. Accordingly, the storage control device 101 controls the disks 111 to 114, which form a storage group. More specifically, the storage control device 101 treats the disks 111 to 114, which form a storage group, as a single RAID group in which redundancy is maintained. There are different levels for RAID, and this embodiment may be implemented with a level of "RAID 1" or higher.

The backup volume 121 stores snapshots serving as copies of the disks 111 to 114 at a certain time. Note that a volume is one of portions of a disk (or disks) into which the disk is logically divided. Therefore, the backup volume 121 may include a single disk or may include a plurality of disks.

Figure 1A:
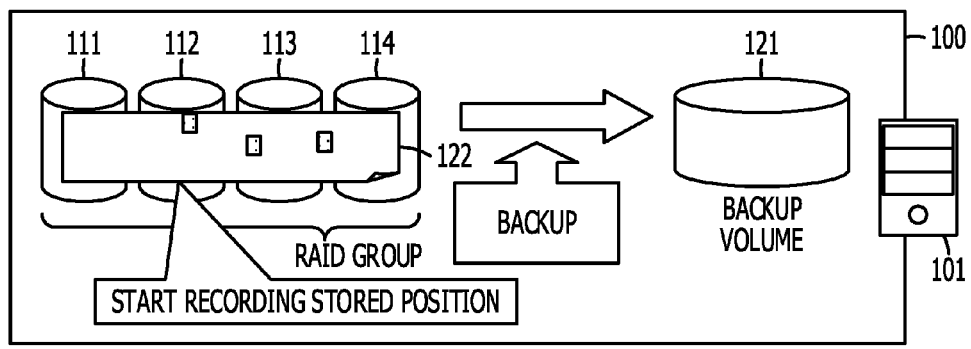
FIGS. 1A to 1D are diagrams illustrating operation examples of a storage control device according to an embodiment.

FIG. 1A illustrates an operation performed by the storage system 100. As first processing performed in the operation, the storage system 100 stores copies of the disks 111 to 114 at a certain time in the backup volume 121, as measures for loss and alteration of data due to a man-caused factor or a software failure. A complete copy obtained at a certain time will be hereinafter referred to as a "snapshot". The generation of the snapshot will be described later with reference to FIG. 3. In this case, write contents designated by a new write request issued after the certain time are not ensured by the backup volume 121. The storage system 100 ensures data in operation by the redundancy of the RAID group, and ensures data deleted due to a man-caused factor or a software failure by the snapshot.

Furthermore, as second processing performed in the operation by the storage system 100, when data of the disks 111 to 114 is updated after the snapshot has been generated, the storage system 100 records the stored position of the updated data in a tracking bitmap 122.

The tracking bitmap 122 is information indicating the stored position in the disks 111 to 114 in which the updated data is stored. For example, the tracking bitmap 122 records data regarding a block in a disk into a single bit corresponding to a serial number given to the block. Specifically, data regarding a first block corresponds to a first bit of the tracking bitmap 122, and data regarding a second block corresponds to a second bit of the tracking bitmap 122. A dotted rectangular region in the tracking bitmap 122 indicates that the bit corresponding to data is on.

The serial number given to each block in each disk is defined as a physical logical block address (PLBA). Also, the serial number given to the block in a unit of the RAID group is defined as a RAID group logical block address (RLBA). Also, the serial number given to the block, among blocks in the RAID group, which is formed by cutting out a portion of a size which a user wants to use is defined as a shared logical block address (SLBA). For example, data in the backup volume 121 may be accessed by designating the SLBA.

Figure 1B:
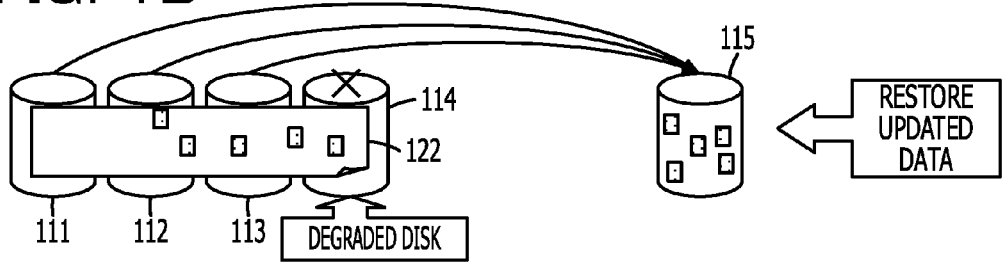
Figure 1C:
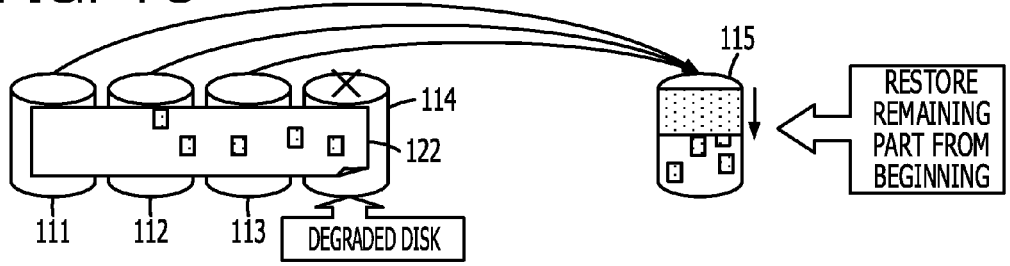
Figure 1D:
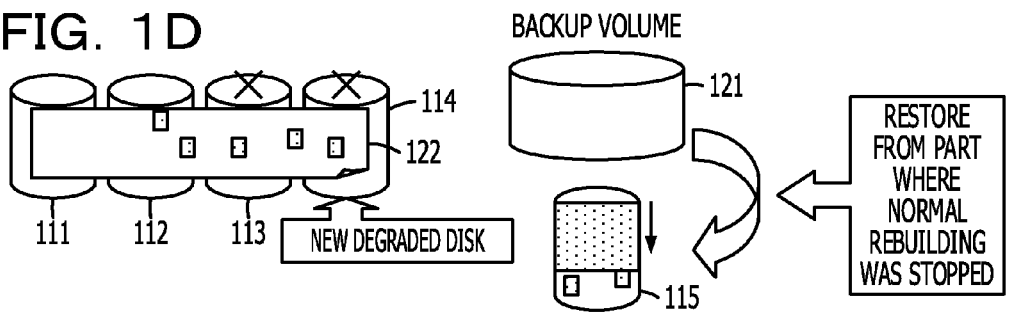

FIGS. 1B to 1D illustrate operations of restoration of the disks 111 to 114. Restoration is performed when a failure occurs in a disk. In this embodiment, as the operation of restoration, three processing are consecutively performed, that is, differential rebuilding as first restoration processing (FIG. 1B), normal rebuilding as second restoration processing (FIG. 1C), cooperative rebuilding with the backup volume 121 as third restoration processing (FIG. 1D). The "rebuilding" means reconstructing the data of the disks 111 to 114 into the state before the failure has occurred to recover redundancy. Cooperative rebuilding with the backup volume 121 will be hereinafter referred to merely as "cooperative rebuilding". A disk in which the failure has occurred will be referred to as a "degraded disk". It is assumed in FIGS. 1B to 1D that a first degraded disk is the disk 114 and a second degraded disk is the disk 113.

Differential rebuilding is processing to first restore the updated information, which are not backed up in the backup volume 121, stored in the first degraded disk 114 among the disks 111 to 114 forming the redundant group by using stored information (that is, for example, a redundant stripe including a plurality of pieces of stripe data and parity data, when the RAID level is "RAID 5") stored in the remaining disks 111 to 113 to tentatively recover the redundancy of the disks 111 to 114.

Normal rebuilding is processing to restore all the stored information stored in the first degraded disk 114 from first stored information therein by using stored information (that is, for example, a redundant stripe including a plurality of pieces of stripe data and parity data, when the RAID level is "RAID 5") stored in the remaining disks 111 to 113 to recover the redundancy of the disks 111 to 114. Using the normal rebuilding, a part other than a part restored by differential rebuilding may be restored.

Cooperative rebuilding is processing to restore the stored information from the backup volume 121 in a state where the second degraded disk 113 that is different from the first degraded disk 114, among the disks 111 to 114, has occurred and the RAID group has failed. In the cooperative rebuilding, a remaining part which has not been restored by differential rebuilding and normal rebuilding may be restored by the first stored information stored in the backup volume 121.

A data restoration destination may be a disk with which the degraded disk is replaced, or may be a hot spare disk 115 that has been prepared in advance in the storage system 100. In this embodiment, the data restoration destination is the hot spare disk 115. The hot spare disk will be referred to as an "HS". The storage control device 101 may perform the restoration either such that the HS 115 is incorporated in the RAID group or such that the HS 115 is not incorporated in the RAID group.

In FIG. 1B, an operation example of differential rebuilding is illustrated. When the disk 114 is the first degraded disk, the storage control device 101 restores in the HS 115, as differential rebuilding, the updated data corresponding to the stored position of the updated data in the disk 114 on the basis of the tracking bitmap 122. The updated data may be data stored at the stored position of the disk 114, and also, may be data that is to be stored at the stored position of the disk 114 after a failure occurs. Specifically, the storage control device 101 restores, in the HS 115, data corresponding to a bit, which is on, of the tracking bitmap 122.

In FIG. 1C, an operation example of normal rebuilding is illustrated. The storage control device 101 restores, as normal rebuilding, data which has not been restored by differential rebuilding, from the beginning of the disk 114.

In FIG. 1D, an operation example of cooperative rebuilding is illustrated. When the disk 113 fails, the storage control device 101 stops normal rebuilding and then restores in the HS 115, as cooperative rebuilding, data of the disk 114 on the basis of the backup volume 121 and the tracking bitmap 122. When information indicating the progress of normal rebuilding is obtained, the storage control device 101 restarts restoration from a part where the normal rebuilding was stopped.

As described above, the storage control device 101 stores information regarding an updated part which has been updated after the RAID backup. When a disk fails, the storage control device 101 restores the updated part. If another disk fails after the restoration, the storage control device 101 restores a part other than the updated part from the backup. Thus, the redundancy of the updated part has been recovered when a failure of the RAID group occurs, and therefore, the storage control device 101 may recover the RAID group. The storage control device 101 will be hereinafter described in detail with reference to FIGS. 2 to 18.

FIG. 2 is a diagram illustrating a hardware configuration example of a storage system. The storage system 100 includes storage control devices 101#0 and 101#1, a host server 201, and a device enclosure (DE) 202. When the postfix reference "#x" is given, it is indicated that the corresponding device is a hardware regarding the storage control device 101#x. The storage control device 101#0 and the storage control device 101#1 are connected with each other via an inter-storage-control-device communication path 203.

The storage control device 101#0 includes a central processing unit (CPU) 211#0, a read-only memory (ROM) 212#0, and a random access memory (RAM) 213#0. The storage control device 101#0 also includes a channel adapter (CA) 214#0 and a disk interface (DI) 215#0. The above-described components are connected to one another via a bus 216#0. Similarly, the storage control device 101#1 includes CPU 211#1, ROM 212#1, RAM 213#1, CA 214#1, DI 215#1, and bus 216#1.

The DE 202 includes a RAID group logical unit (RLU) 221#0, a RLU 221#1, and the HS 115. The RLU 221#0 includes disks 111#0 to 114#0. The RLU 221#1 includes disks 111#1 to 114#1.

The storage control device 101 is a device that controls a disk group serving as a storage. Specifically, the storage control device 101#0 controls the disks 111#0 to 114#0 included in the RLU 221#0. The storage control device 101#1 controls the disks 111#1 to 114#1 included in the RLU 221#1. As specific contents of controlling, the storage control device 101 controls access to the disks 111 to 114, and the recovery operation, such as rebuilding and so forth.

The host server 201 is a server connected to the storage control device 101. The host server 201 may be connected, via a network, to a user terminal that uses the storage system 100. The DE 202 is a housing that accommodates the disks 111 to 114.

The CPU 211 is an arithmetic processing unit that controls the entire storage control device 101. The CPU 211 may include a cache memory. The ROM 212 is a nonvolatile memory that stores a program, such as a boot program and so forth. The RAM 213 is a volatile memory used as a work area of the CPU 211. The CA 214 is a module that provides an interface with the host server 201. As the CA 214, a fibre channel (FC), an Internet small computer system interface (iSCSI), or the like, may be employed. The DI 215 is a module that connects the storage control device 101 with the disks 111 to 114.

The RLU 221 is an assembly of disks distinguished by numerical references given thereto in order to identify a plurality of RAID groups. FIG. 2 illustrates that the DE 202 includes the RLU 221#0 given the numerical reference "#0" and the RLU 221#1 given the numerical reference "#1". The storage system 100 uses the RLU 221#1 as the backup volume 121. The RAID level of the RLU 221#0 may be the same as the RAID level of the RLU 221#1, and also, may be different from the RAID level of the RLU 221#1.

Subsequently, an operation example of one point copy (OPC) of generating a complete copy of a copy source disk, which the storage control device 101 according to this embodiment uses, will be described with reference to FIG. 3.

Figure 3:
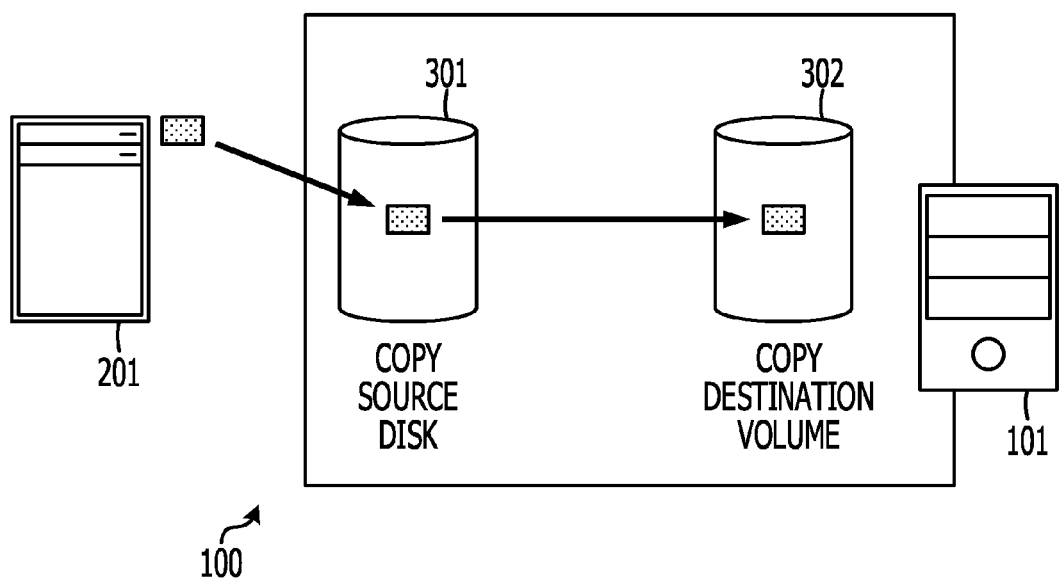
FIG. 3 is a diagram illustrating an operation example of OPC.

FIG. 3 is a diagram illustrating an operation example of OPC. The OPC is a function of generating a snapshot serving as a complete copy of a copy source disk 301 at a certain time. The storage control device 101 copies the copy source disk 301 from the beginning thereof to a copy destination volume 302 at a certain time. The copy source disk 301 and the copy destination volume 302 have the same size. Furthermore, when a write request is issued from the host server 201 while the OPC is being executed, the storage control device 101 saves old data of the copy source disk 301 to the copy destination volume 302 before writing new data to the copy source disk 301. Thus, the storage control device 101 causes write contents designated by a new write request issued after the snapshot is generated not to be reflected to the copy destination volume 302.

Also, the storage control device 101 puts into an "on" state, as an input/output (I/O) tracking function, the corresponding bit of the tracking bitmap 122 that records information regarding a part for which a write request is issued. When starting rebuilding, the storage control device 101 copies the tracking bitmap 122 and prepares a rebuilding bitmap. The storage control device 101 executes a method for controlling storages according to this embodiment using the OPC, the tracking bitmap 122, and the rebuilding bitmap.

Function of Storage Control Device 101

Figure 4:
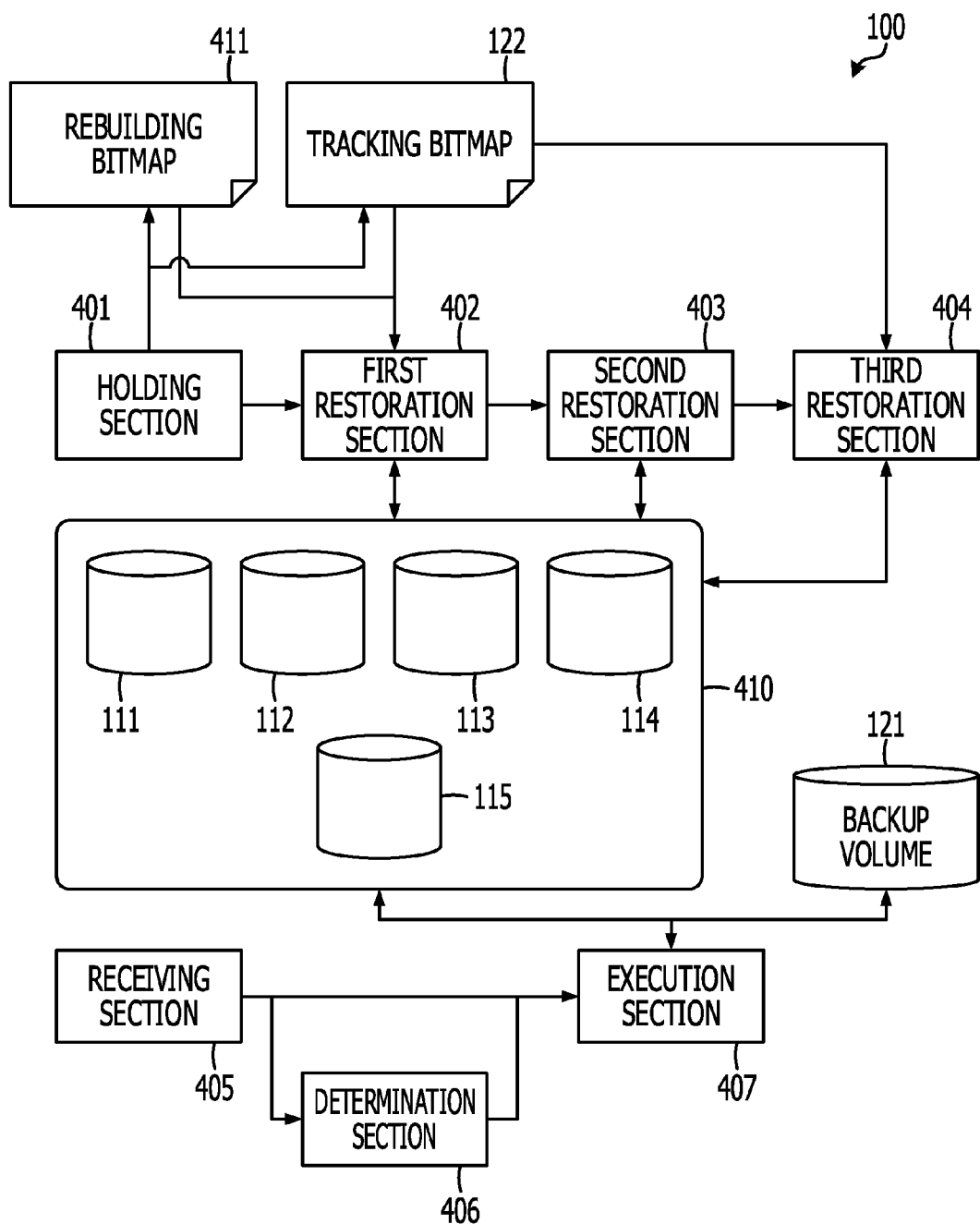
FIG. 4 is a block diagram illustrating a functional configuration example of a storage control device.

Next, the function of the storage control device 101 will be described. FIG. 4 is a block diagram illustrating a functional configuration example of the storage control device. The storage control device 101 includes a holding section 401, a first restoration section 402, a second restoration section 403, a third restoration section 404, a receiving section 405, a determination section 406, and an execution section 407. The holding section 401 to the execution section 407 are included in a control section. The CPU 211 executes a program stored in a storage device, thereby realizing functions of the holding section 401 to the execution section 407. Specifically, the storage device is, for example, a device, such as the ROM 212, the RAM 213, and so forth, illustrated in FIG. 2.

The storage control device 101 may access a disk group 410 including the disks 111 to 114 and the HS 115, the backup volume 121, the tracking bitmap 122, and a rebuilding bitmap 411. The tracking bitmap 122 and the rebuilding bitmap 411 are stored in the storage device, such as the RAM 213. The rebuilding bitmap 411 is data to which the tracking bitmap 122 is copied when the execution of differential rebuilding is started by the first restoration section 402.

When the first stored information of the disk 114 of the RAID group is copied to the backup volume 121 and then the first stored information of the disk 114 is updated, the holding section 401 holds management information including information indicating a stored position in the disk 114 where to be updated. The information indicating the stored position in the disk 114 where to be updated is stored in the tracking bitmap 122. If the RAID level is "RAID 1", the stored information includes user data and, if the RAID level is "RAID 5", the stored information includes user data and parity data. The management information may include the updated contents in addition to the information indicating the stored position. Note that the data to be held is stored in the storage device, such as the RAM 213 and so forth.

When a failure occurs in the disk 114, the first restoration section 402 executes differential rebuilding to restore, in the HS 115 that is different from the disks 111 to 114, second stored information at the stored position in the disk 114, on the basis of the management information held by the holding section 401. Note that the restored second stored information is stored in a storage region, such as the HS 115.

The second restoration section 403 executes normal rebuilding to restore third stored information among all of stored information stored in the disk 114, on the basis of stored information stored in the remaining disks of the plurality of storages other than the disk 114. The third stored information is the remaining stored information other than the second stored information restored by differential rebuilding executed by the first restoration section 402. Note that the restored third stored information is stored in the storage region, such as the HS 115.

When a failure occurs in the disk 113 which is different from the disk 114, among the disks 111 to 114, while normal rebuilding is being executed by the second restoration section 403, the third restoration section 404 stops the normal rebuilding. Subsequently, the third restoration section 404 restores, in the HS 115, stored information stored in the disk 114, on the basis of the first stored information copied to the backup volume 121 and the management information. For example, when the bit of the tracking bitmap 122 is off for stored information to be restored, the third restoration section 404 restores, in the HS 115, the stored information to be restored among all pieces of the stored information of the disk 114, by referring to the stored information of the backup volume 121.

When a failure occurs in the disk 113 while normal rebuilding is being executed, the third restoration section 404 stops the normal rebuilding. Subsequently, the third restoration section 404 may restore, in the HS 115, stored information which has not been restored by the normal rebuilding, among all pieces of the stored information of the disk 114, on the basis of the first stored information copied to the backup volume 121, the management information, and information indicating the progress of the normal rebuilding. If the normal rebuilding is performed from RLBA=0, the information indicating the progress of the normal rebuilding represents a maximum value of the RLBA for which restoration is completed. For example, the third restoration section 404 performs restoration from the RLBA next to the maximum RLBA for which restoration is completed. Alternatively, the third restoration section 404 may perform restoration from the maximum RLBA of the RAID group to the RLBA next to the maximum RLBA for which restoration is completed. Note that the restored stored information is stored in the storage region, such as the HS 115.

The receiving section 405 receives a write request issued to the RAID group. Also, the receiving section 405 receives a read request issued to the RAID group. The write request and the read request are issued, for example, from the host server 201. Note that a reception result is stored in the storage region, such as the RAM 213.

When a read request is received by the receiving section 405 while differential rebuilding, normal rebuilding, or cooperative rebuilding is being executed, the determination section 406 determines whether or not the stored information of a read destination designated by the read request is restored stored information. Whether or not the stored information of the read destination is restored stored information may be determined by referring to the value of the RLBA indicating the progress of the restoration processing and the bit of the tracking bitmap 122. A specific determination method will be described later with reference to FIG. 13, FIG. 16, and FIG. 18.

When a read request is received while cooperative rebuilding is being executed, the determination section 406 may determine whether or not the stored information of a read destination designated by the read request is the stored information restored by differential rebuilding, normal rebuilding, or cooperative rebuilding.

When a read request is received while differential rebuilding is being executed, the determination section 406 determines whether or not the stored information of a read destination is included in the stored information restored by the differential rebuilding identified on the basis of the information indicating the progress of the differential rebuilding and the management information. For example, if the differential rebuilding is performed from RLBA=0, the information indicating the progress of the differential rebuilding represents the maximum value of the RLBA for which restoration is completed. For example, assume that the management information is RLBA=1, 5, 10, 14. In this case, when the information indicating the progress of the differential rebuilding represents 10, the restored stored information is stored information of RLBA=1, 5.

Also, when a read request is received while differential rebuilding is being executed, the determination section 406 may determine whether or not the stored information of a read destination designated by the read request satisfies the following condition. The condition is that the stored information of the read destination is neither stored information identified by the information indicating the progress of the differential rebuilding nor stored information identified by the management information before the execution of the differential rebuilding is started but stored information identified by the management information after the execution of the differential rebuilding is started. The management information before the execution of the differential rebuilding is started is described in the rebuilding bitmap 411. Note that a determination result is stored in the storage region, such as the RAM 213.

When a write request is received while differential rebuilding or normal rebuilding is being executed, the execution section 407 executes write processing of writing write contents of a write request to the storage region of a write destination designated by the write request in disks of the disk group 410 other than the degraded disk. In other words, disks of the disk group 410 other than the disk in which a failure has occurred are remaining disks of the disks 111 to 114 other than one in which a failure has occurred and the HS 115.

When it is determined by the determination section 406 that the stored information of the read destination is restored stored information, the execution section 407 executes read processing of reading the stored information of the read destination in remaining storages and the HS 115. When it is determined by the determination section 406 that the stored information of the read destination is not restored stored information, the execution section 407 may execute read processing of reading the stored information of the read destination among pieces of the stored information copied to the backup volume 121. Read processing performed when the stored information of the read destination is in a degraded disk will be referred to a "degraded mode read". On the other hand, read processing performed when the stored information of the read destination is in a disk in which no failure has occurred will be referred to a "normal mode read".

When it is determined by the determination section 406 that the stored information of the read destination is restored stored information, the execution section 407 executes read processing of reading the stored information of the read destination in remaining storages and the HS 115. When it is determined by the determination section 406 that the stored information of the read destination is not restored stored information, the execution section 407 may obtain stored information having the same contents as those of the stored information of the read destination on the basis of the stored information in the remaining storages. The processing for obtaining the stored information differs depending on the RAID level. When the RAID level is "RAID 1", stored information having the same contents as those of the stored information of the read destination is obtained from one of the pair disks, which has not failed. When the RAID level is "RAID 5", stored information having the same contents of those of the stored information of the read destination is obtained from a calculation result of XOR of stored information on the disks which have not failed.

When it is determined by the determination section 406 that the following condition is satisfied, the execution section 407 may execute read processing of reading the stored information of the read destination in the remaining disks and the HS 115. The condition is that the stored information of the read destination is neither stored information identified by the information indicating the progress of the differential rebuilding nor stored information identified by the management information before the execution of the differential rebuilding is started but stored information identified by the management information after the execution of the differential rebuilding is started.

Figure 5A:
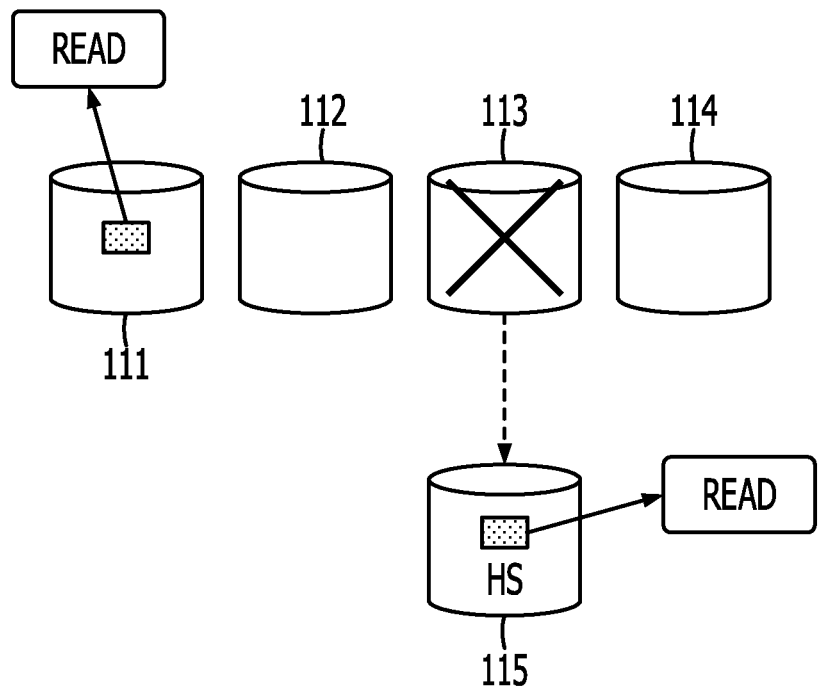
FIGS. 5A and 5B are diagrams illustrating operation examples of normal mode read and degraded mode read.
Figure 5B:
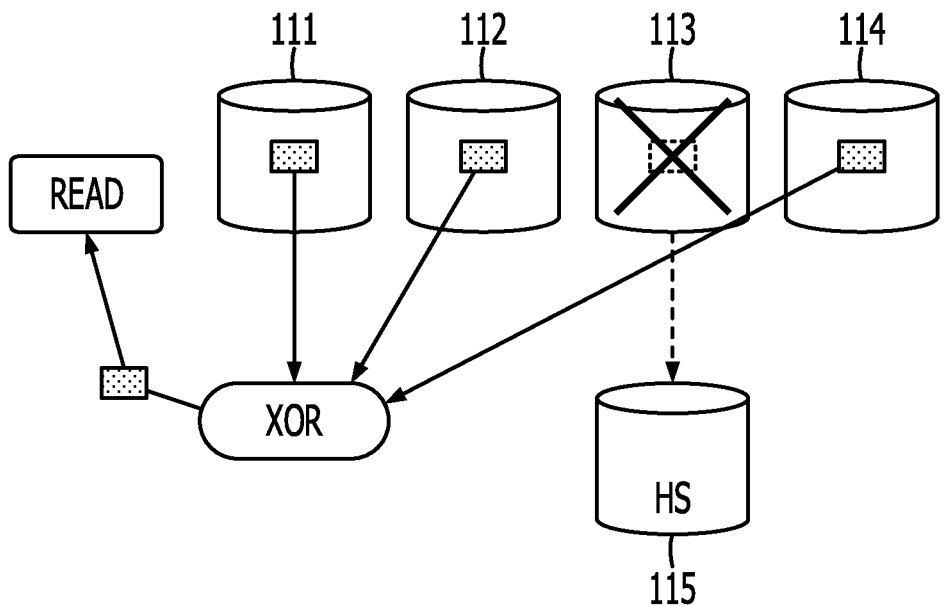

FIGS. 5A and 5B are diagrams illustrating operation examples of normal mode read and degraded mode read. FIG. 5A illustrates an operation example of normal mode read performed when the RAID level is "RAID 5", and FIG. 5B illustrates an operation example of degraded mode read performed when the RAID level is "RAID 5". It is assumed, in FIGS. 5A and 5B, that there are the disks 111 to 114 and the HS 115, and a failure has occurred in the disk 113.

A normal mode read is processing of reading stored information stored in the disks 111, 112, and 114 in which no failure has occurred. As illustrated in FIG. 5A, when a normal mode read is performed, the storage control device 101 reads stored information from a disk in which no failure has occurred. Also, when reading stored information for which restoration in the HS 115 is completed, the storage control device 101 reads the stored information from the HS 115 as a normal mode read.

A degraded mode read is processing of reading stored information stored in a disk in which a failure has occurred. As illustrated in FIG. 5B, when a degraded mode read is performed, the storage control device 101 reads stored information in the disks 111, 112, and 114 in which no failure has occurred and generates stored information to be read without accessing the disk 113 in which a failure has occurred. When the RAID level is "RAID 5", the storage control device 101 generates stored information to be read by performing XOR operation on the stored information of the disk 111, the stored information of the disk 112, and the stored information of the disk 114, and reads the generated stored information.

Next, for differential rebuilding, normal rebuilding, and cooperative rebuilding, the state of stored information that is updated in the HS 115 is described with reference to FIG. 6, FIG. 7, and FIG. 8.

Figure 6:
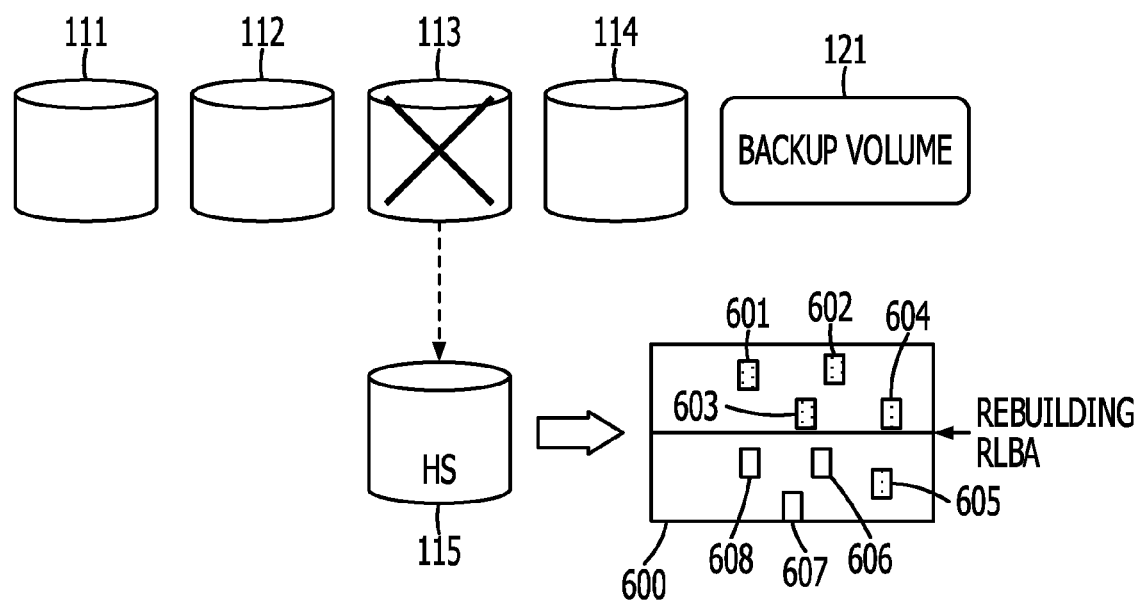
FIG. 6 is a diagram illustrating a state of stored information that is updated in an HS while differential rebuilding is being executed.

FIG. 6 is a diagram illustrating a state of stored information that is updated in an HS while differential rebuilding is being executed. A bitmap 600 indicates the states of the tracking bitmap 122 and the rebuilding bitmap 411 for the HS 115 while differential rebuilding is being executed. The bitmap 600 includes bits 601 to 608. In FIG. 6, FIG. 7, and FIG. 8, when the inside of the bits 601 to 608 are dotted, it is indicated that the stored information corresponding to each of the bits is ensured.

Each of the bits 601 to 603 is a bit with which the rebuilding bitmap 411 is on and furthermore the RLBA corresponding to the bit is less than the rebuilding RLBA indicating the progress of rebuilding processing. Specifically, the rebuilding RLBA indicates the value of RLBA for which the rebuilding processing is performed. The bits 601 to 603 each indicate that the stored information corresponding to each of the bits 601 to 603 is stored information ensured by the execution of differential rebuilding.

Each of the bits 604 and 605 is a bit with which the tracking bitmap 122 is on. The bits 604 and 605 each indicate that the stored information corresponding to each of the bits 604 and 605 is stored information which has been written in response to a write request issued after rebuilding processing is started and for which write contents designated by the write request are ensured.

Each of the bits 606 to 608 is a bit with which the tracking bitmap 122 is off, the rebuilding bitmap 411 is on, and the RLBA corresponding to the bit is the rebuilding RLBA or more. The bits 606 to 608 each indicate that the stored information corresponding to each of the bits 606 to 608 is a target of differential rebuilding but has not been restored yet.

Figure 7:
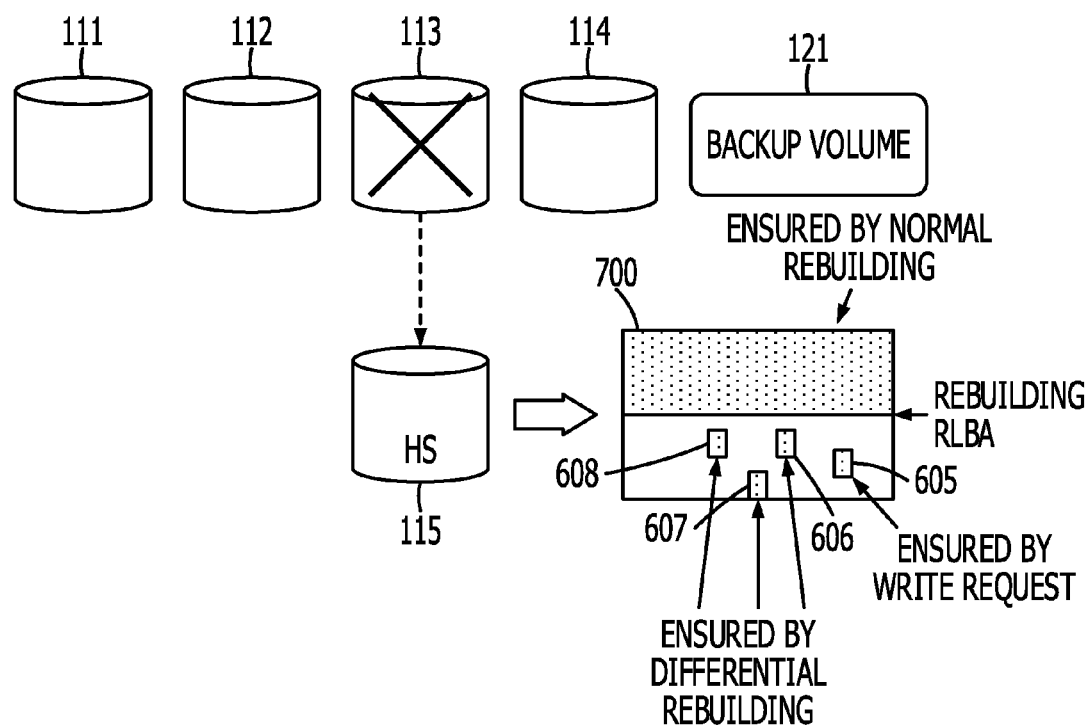
FIG. 7 is a diagram illustrating a state of stored information that is updated in an HS while normal rebuilding is being executed.

FIG. 7 is a diagram illustrating a state of stored information that is updated in an HS while normal rebuilding is being executed. A bitmap 700 indicates the states of the tracking bitmap 122 and the rebuilding bitmap 411 for the HS 115 while normal rebuilding is being executed. The bitmap 700 includes the bits 605 to 608. Bits including the bits 601 to 604 illustrated in FIG. 6, each of which corresponds to a RLBA which is less than the rebuilding RLBA, indicate that the stored information corresponding to each of the bits is stored information ensured by the execution of normal rebuilding.

The bit 605 is a bit with which the tracking bitmap 122 is on and the RLBA corresponding to the bit is the rebuilding RLBA or more. The bit 605 indicates that the stored information corresponding to the bit 605 is stored information which has been written in response to a write request issued after rebuilding processing is started and then has been ensured.

Each of the bits 606 to 608 is a bit with which the tracking bitmap 122 is on and the RLBA corresponding to the bit is more than the rebuilding RLBA. The bits 606 to 608 each indicate that the stored information corresponding to each of the bits 606 to 608 is stored information ensured by the execution of differential rebuilding. Each of the bits 605 to 608 corresponds to a bit with which the tracking bitmap 122 is on.

Figure 8:
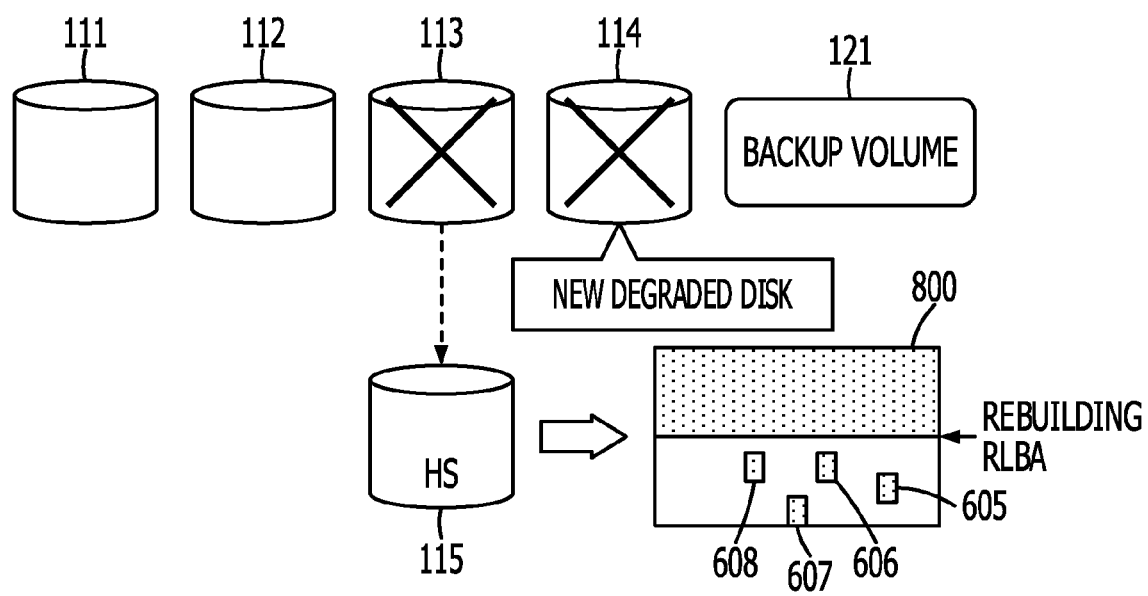
FIG. 8 is a diagram illustrating a state of stored information that is updated in an HS while cooperative rebuilding is being executed.

FIG. 8 is a diagram illustrating a state of stored information that is updated in an HS while cooperative rebuilding is being executed. In FIG. 8, a state in which a failure occurs in the disk 114 while normal rebuilding is being executed and thus the normal rebuilding is shifted to cooperative rebuilding. A bitmap 800 indicates the states of the tracking bitmap 122 and the rebuilding bitmap 411 for the HS 115 while the cooperative rebuilding is being executed. The bitmap 800 includes the bits 605 to 608. Bits, including the bits 601 to 604 illustrated in FIG. 6, each of which corresponds to an RLBA which is less than the rebuilding RLBA, indicate that the stored information corresponding to each of the bits is stored information ensured by the execution of the normal rebuilding.

Each of the bits 605 to 608 is a bit with which the tracking bitmap 122 is on and the RLBA corresponding to the bit is the rebuilding RLBA or more. A region on the HS 115 in which the latest stored information is ensured to be written is in the range from RLBA=0 to RLBA=the rebuilding RLBA, and bits with which the tracking bitmap 122 is on. Subsequently, degraded mode read performed while the cooperative rebuilding is being executed will be described. When the read target RLBA is less than the rebuilding RLBA, the storage control device 101 performs a first degraded mode read illustrated in FIG. 9. When the read target RLBA is the rebuilding RLBA or more, the storage control device 101 performs a second degraded mode read illustrated in FIG. 10.

Figure 9:
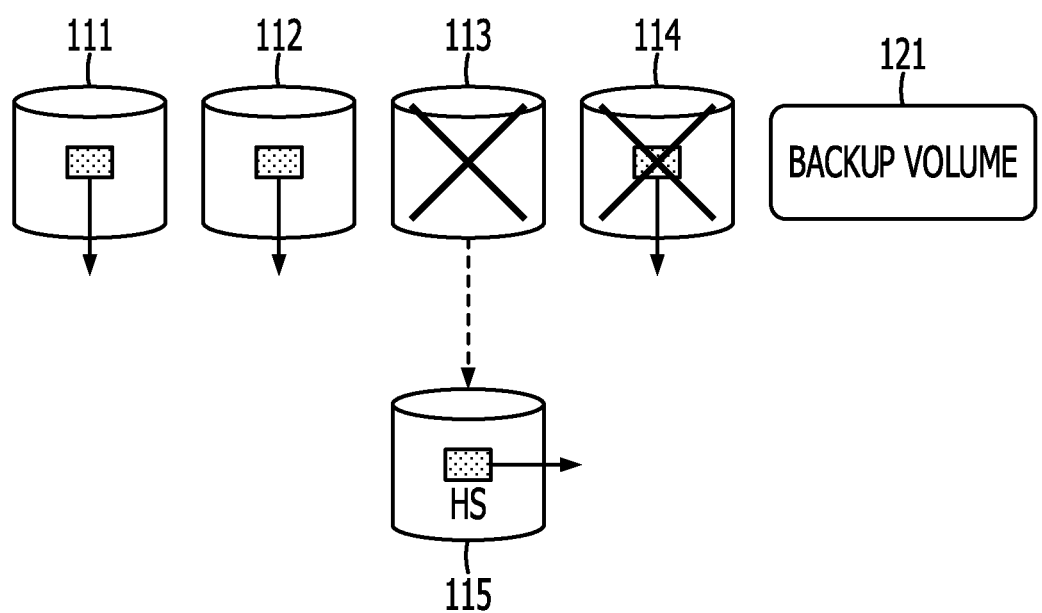
FIG. 9 is a diagram illustrating an operation example of first degraded mode read performed while cooperative rebuilding is being executed.

FIG. 9 is a diagram illustrating an operation example of first degraded mode read performed while cooperative rebuilding is being executed. An operation example of degraded mode read which does not use the backup volume 121 will be described with reference to FIG. 9. A degraded mode read that does not use the backup volume 121 is the same as the read processing performed in a state where one of the disks of the RAID group is degraded.

When the read target RLBA is in the disk 111 or the disk 112 in which no failure has occurred, the storage control device 101 reads stored information from the disk 111 or the disk 112.

When the storage control device 101 reads stored information from the HS 115, it is ensured that the latest stored information has been already written. Therefore, the storage control device 101 reads stored information from the HS 115.

When the storage control device 101 reads stored information from the disk 114 that has become a new degraded disk, the storage control device 101 restores stored information from a disk of the same stripe, which has not failed, and the HS 115, and then, reads the restored stored information. For example, when the RAID level is "RAID 1", the storage control device 101 reads stored information from one of the pair disks, which has not failed. When the RAID level is "RAID 5", the storage control device 101 restores stored information of the degraded disk from a calculation result of XOR of stored information stored in the disks which have not failed and the HS 115.

Figure 10:
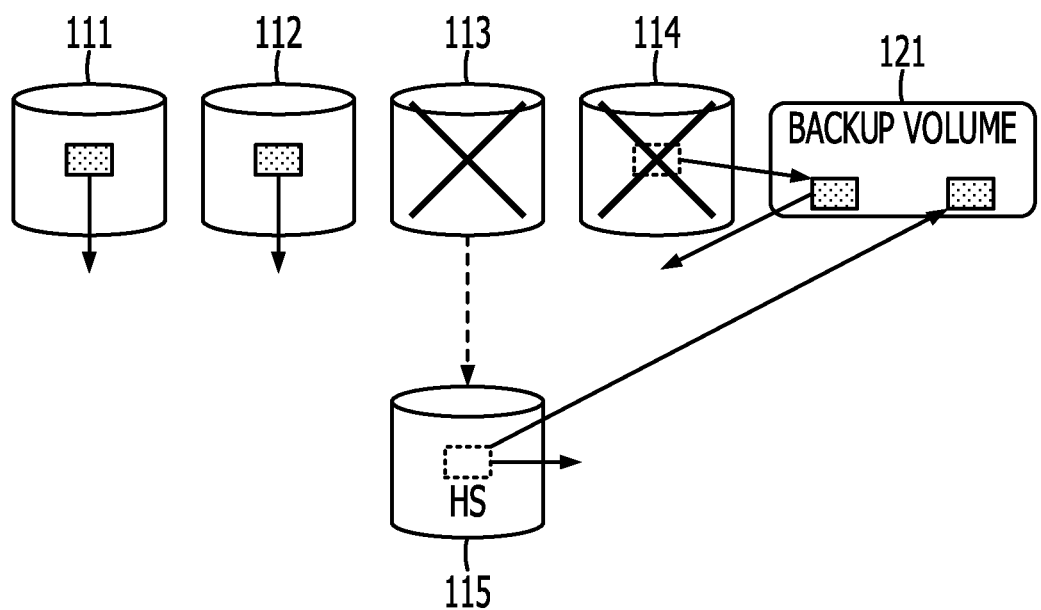
FIG. 10 is a diagram illustrating an operation example of second degraded mode read performed while cooperative rebuilding is being executed.

FIG. 10 is a diagram illustrating an operation example of second degraded mode read performed while cooperative rebuilding is being executed. An operation example of degraded mode read using the backup volume 121 will be described with reference to FIG. 10. In degraded mode read using the backup volume 121, the HS 115 is in the same state as a degraded state. A read target is a part of the backup volume 121 in which no new write request is issued after backup, and therefore, all stored information may be read from the backup volume 121.

When the read target RLBA is in the disk 111 or the disk 112 in which no failure has occurred, the storage control device 101 reads stored information from the disk 111 or the disk 112.

When the storage control device 101 reads stored information from the HS 115, the storage control device 101 reads stored information from the SLBA on the backup volume 121 as uniquely identified from the read target RLBA.

When the storage control device 101 reads stored information from the disk 114 that has become a new degraded disk, the storage control device 101 reads stored information from the backup volume 121. State transition while recovery is being performed will be hereinafter described with reference to FIG. 11.

Figure 11:
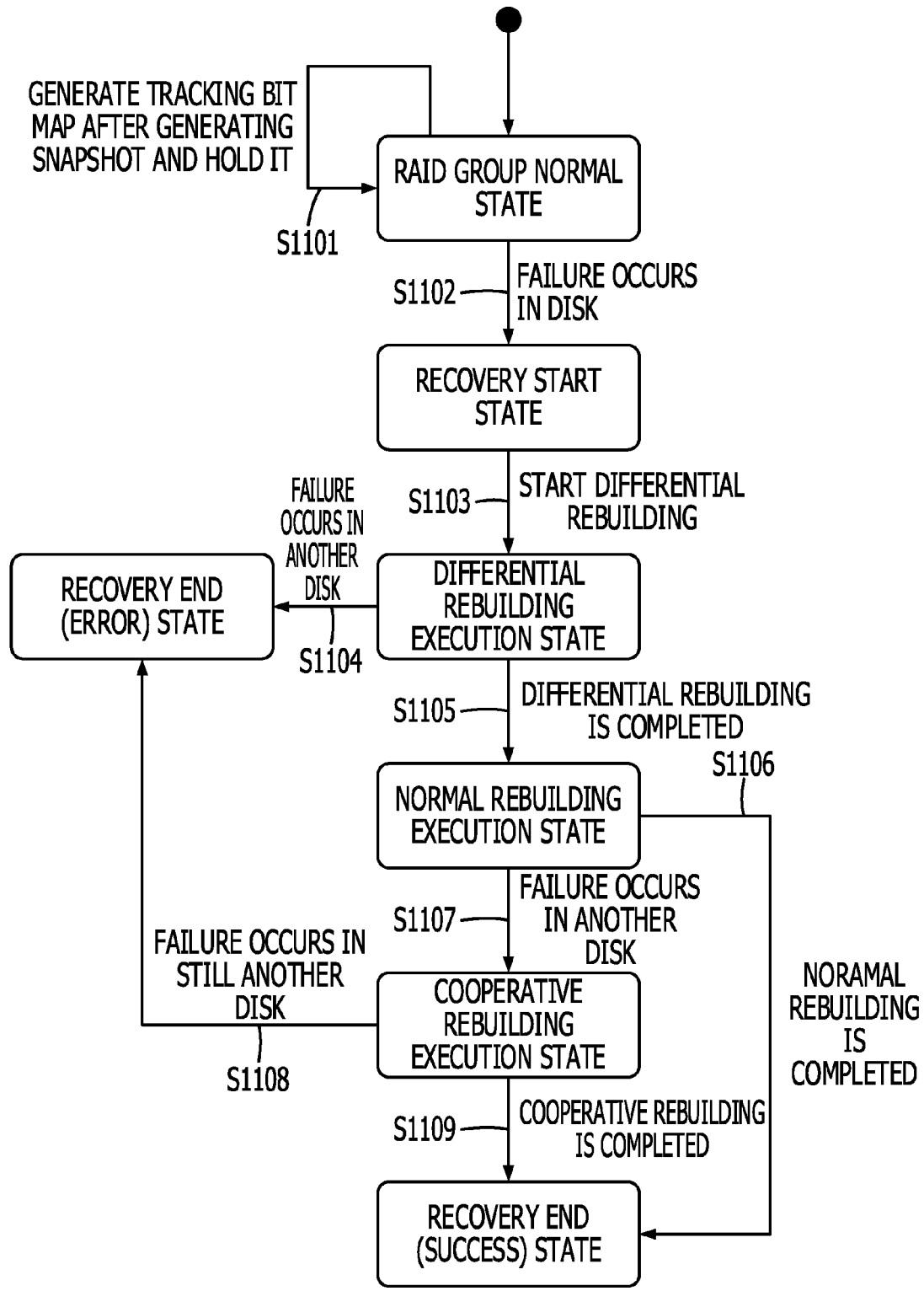
FIG. 11 is a chart illustrating an example of state transition of a storage system.

FIG. 11 is a chart illustrating an example of state transition of the storage system. First, the storage system 100 is in a RAID group normal state. In the RAID group normal state, the storage control device 101 regularly generates a snapshot, and furthermore, generates, after generating the snapshot, the tracking bitmap 122 to hold it in the storage region of the storage control device 101 (S1101). In the RAID group normal state, when a failure occurs in a disk (S1102), the storage system 100 is put into a recovery start state. In the recovery start state, the storage control device 101 sets the HS 115 as an alternative disk for the degraded disk in which the failure has occurred. The storage control device 101 may set, as an alternative disk for the degraded disk, a disk with which the administrator of the storage control device 101 has been replaced the degraded disk.

In the recovery start state, when differential rebuilding is started (S1103), the storage system 100 is put into a differential rebuilding execution state. Details of the differential rebuilding will be described later with reference to FIG. 12. In the differential rebuilding execution state, when a failure occurs in another disk (S1104), the storage system 100 is put into a recovery end (error) state. In the differential rebuilding execution state, when the differential rebuilding is completed (S1105), the storage system 100 is put into a normal rebuilding execution state and starts normal rebuilding. Details of the normal rebuilding will be described later with reference to FIG. 15.

In the normal rebuilding execution state, when the normal rebuilding is completed (S1106), the storage system 100 is put into a recovery end (success) state. In the normal rebuilding execution state, when a failure occurs in another disk (S1107), the storage system 100 is put into a cooperative rebuilding execution state and starts cooperative rebuilding. Details of the cooperative rebuilding will be described later with reference to FIG. 17.

In the cooperative rebuilding execution state, when a failure occurs in still another disk (S1108), the storage system 100 is put into a recovery end (error) state. In the cooperative rebuilding execution state, when the cooperative rebuilding is completed (S1109), the storage system 100 is put into a recovery end (success) state.

Figure 12:
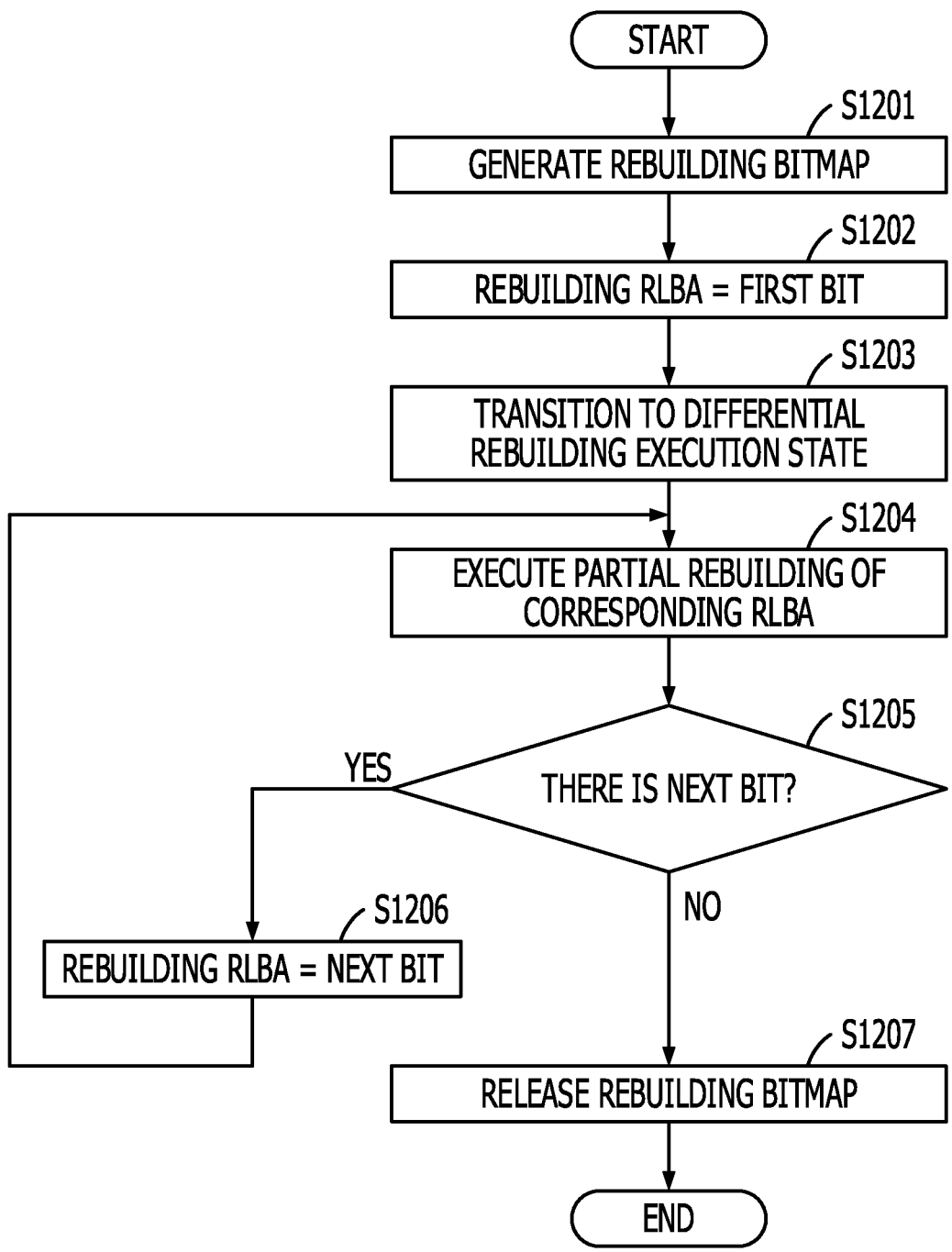
FIG. 12 is a flowchart illustrating an example of a procedure of differential rebuilding.

FIG. 12 is a flowchart illustrating an example of a procedure of differential rebuilding. Differential rebuilding is processing of restoring stored information whose redundancy has been reduced and which has been updated. The storage control device 101 copies a tracking bitmap 122 at the time of starting differential rebuilding and generates a rebuilding bitmap 411 (S1201). In subsequent processing, the storage control device 101 manages the progress of differential rebuilding using the rebuilding bitmap 411 which does not include a new write request issued after differential rebuilding is started, and the rebuilding RLBA. A part that is to be restored is determined not by using the tracking bitmap 122 but by using the rebuilding bitmap 411 copied from the tracking bitmap 122, because the tracking bitmap 122 is dynamically changed by a write request and thus progress management by using the tracking bitmap 122 is complicated.

Next, the storage control device 101 sets the RLBA corresponding to a first bit as the rebuilding RLBA (S1202). Subsequently, the state of the storage control device 101 transitions to the differential rebuilding execution state (S1203). Next, the storage control device 101 executes partial rebuilding of the RLBA (S1204). This RLBA is an RLBA designated by the rebuilding RLBA. Processing of the partial rebuilding differs depending on the RAID level. For example, when the RAID level is "RAID 1", the storage control device 101 copies user data of stored information from the RLBA of a rebuilding source disk and writes the copied user data to the RLBA of a rebuilding destination disk. When the RAID level is "RAID 5", the storage control device 101 reads stripe data and parity data of stored information from a plurality of rebuilding source disks, performs XOR of the stripe data and parity data, and writes the obtained by performing the XOR to the rebuilding destination disk.

Subsequently, the storage control device 101 determines whether or not there is a next bit (S1205). The next bit is a bit indicated next by the rebuilding bitmap 411. When there is the next bit (YES in S1205), the storage control device 101 sets the RLBA corresponding to the next bit as the rebuilding RLBA (S1206). After executing S1206, the processing of the storage control device 101 shifts to S1204.

When there is no next bit (NO in S1205), the storage control device 101 releases the rebuilding bitmap 411 (S1207). After the execution of S1207 is ended, the storage control device 101 ends the differential rebuilding. Thus, the storage system 100 may restore stored information whose redundancy has been reduced and which has been updated.

Figure 13:
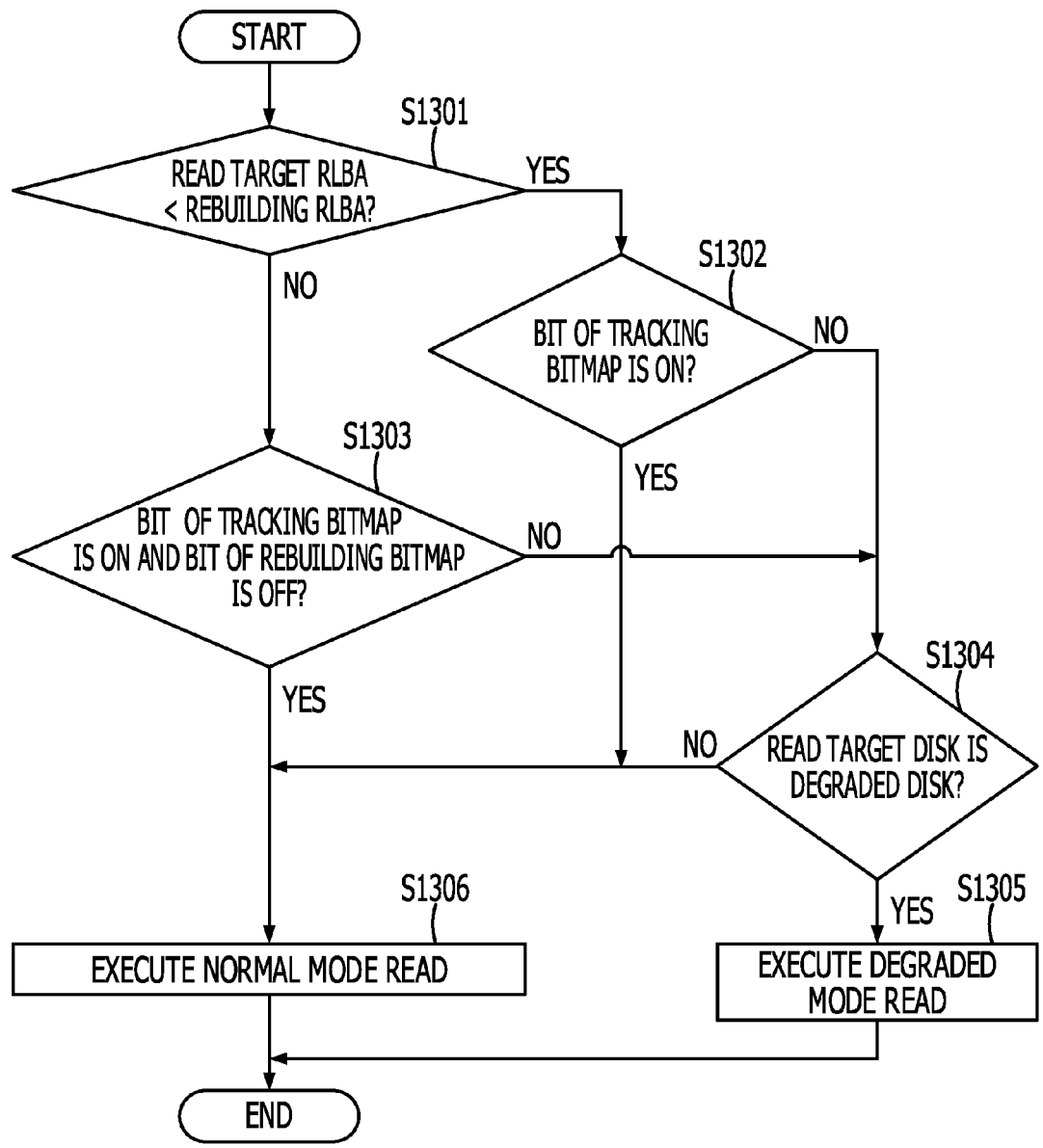
FIG. 13 is a flowchart illustrating an example of a procedure of read processing during differential rebuilding.

FIG. 13 is a flowchart illustrating an example of read processing during differential rebuilding. Read processing during differential rebuilding is processing performed when a read request is issued while differential rebuilding is being executed.

When the storage control device 101 receives a read request, the storage control device 101 determines whether or not a read target RLBA is less than the rebuilding RLBA (S1301). When the read target RLBA is less than the rebuilding RLBA (YES in S1301), the storage control device 101 subsequently determines whether or not the bit of the tracking bitmap 122, corresponding to the read target RLBA, is on (S1302).

When the read target RLBA is not less than the rebuilding RLBA (NO in S1301), the storage control device 101 determines whether or not the bit of the tracking bitmap 122, corresponding to the read target RLBA, is on and the bit of the rebuilding bitmap 411, corresponding to the read target RLBA, is off (S1303).

When the bit of the tracking bitmap 122, corresponding to the read target RLBA, is not on (NO in S1302) or when the condition of S1303 is not satisfied (NO in S1303), the storage control device 101 determines whether or not a read target disk is a degraded disk (S1304). When the read target disk is a degraded disk (YES in S1304), the storage control device 101 executes a degraded mode read illustrated in FIG. 5B (S1305).

When the bit of the tracking bitmap 122, corresponding to the read target RLBA, is on (YES in S1302), when the condition of S1303 is satisfied (YES in S1303), or when the read target disk is not a degraded disk (NO in S1304), the storage control device 101 executes a normal mode read illustrated in FIG. 5A (S1306). After S1305 or S1306 is ended, the storage control device 101 ends read processing during differential rebuilding. By executing read processing during differential rebuilding, the storage system 100 may receive, during differential rebuilding, a read request to execute read processing.

A reason why the tracking bitmap 122, not the rebuilding bitmap 411, is referred to will be described. In response to the write request issued after the execution of differential rebuilding is started, the storage control device 101 executes write processing including a write to the HS 115. For a region on the HS 115, which is indicated by an RLBA that is less than the rebuilding RLBA, stored information before the execution of the differential rebuilding is started has been restored by differential rebuilding. Furthermore, for a new write request recorded in the tracking bitmap 122, write contents designated by the new write request are ensured on the HS 115. Therefore, the storage control device 101 performs a normal mode read. For the tracking bitmap 122 after the rebuilding RLBA, the storage control device 101 performs a normal mode read for stored information written in response to the write request issued after the execution of the differential rebuilding is started. For stored information written in response to the write request issued after the execution of the differential rebuilding is started, the corresponding bit of the rebuilding bitmap 411 is not on, and the corresponding bit of the tracking bitmap 122 is on.

Figure 14:
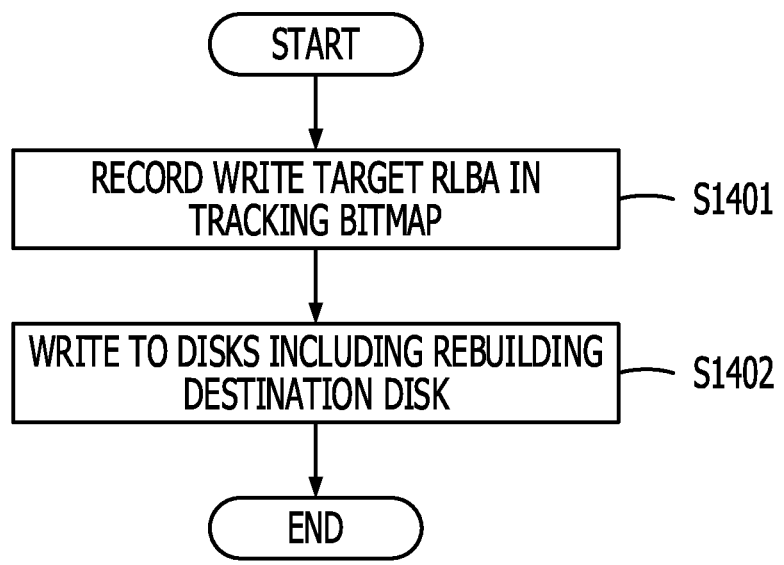
FIG. 14 is a flowchart illustrating an example of a procedure of write processing during rebuilding processing.

FIG. 14 is a flowchart illustrating an example of a procedure of write processing during differential rebuilding. Write processing during differential rebuilding is processing performed when a write request is issued while differential rebuilding is being executed.

When the storage control device 101 receives a write request, the storage control device 101 records the RLBA of the write request in the tracking bitmap 122 (S1401). Next, the storage control device 101 performs a write to disks including a rebuilding destination disk (S1402). After S1402 is ended, the storage control device 101 ends write processing during differential rebuilding. By executing write processing during differential rebuilding, the storage system 100 may receive a write request during differential rebuilding.

Figure 15:
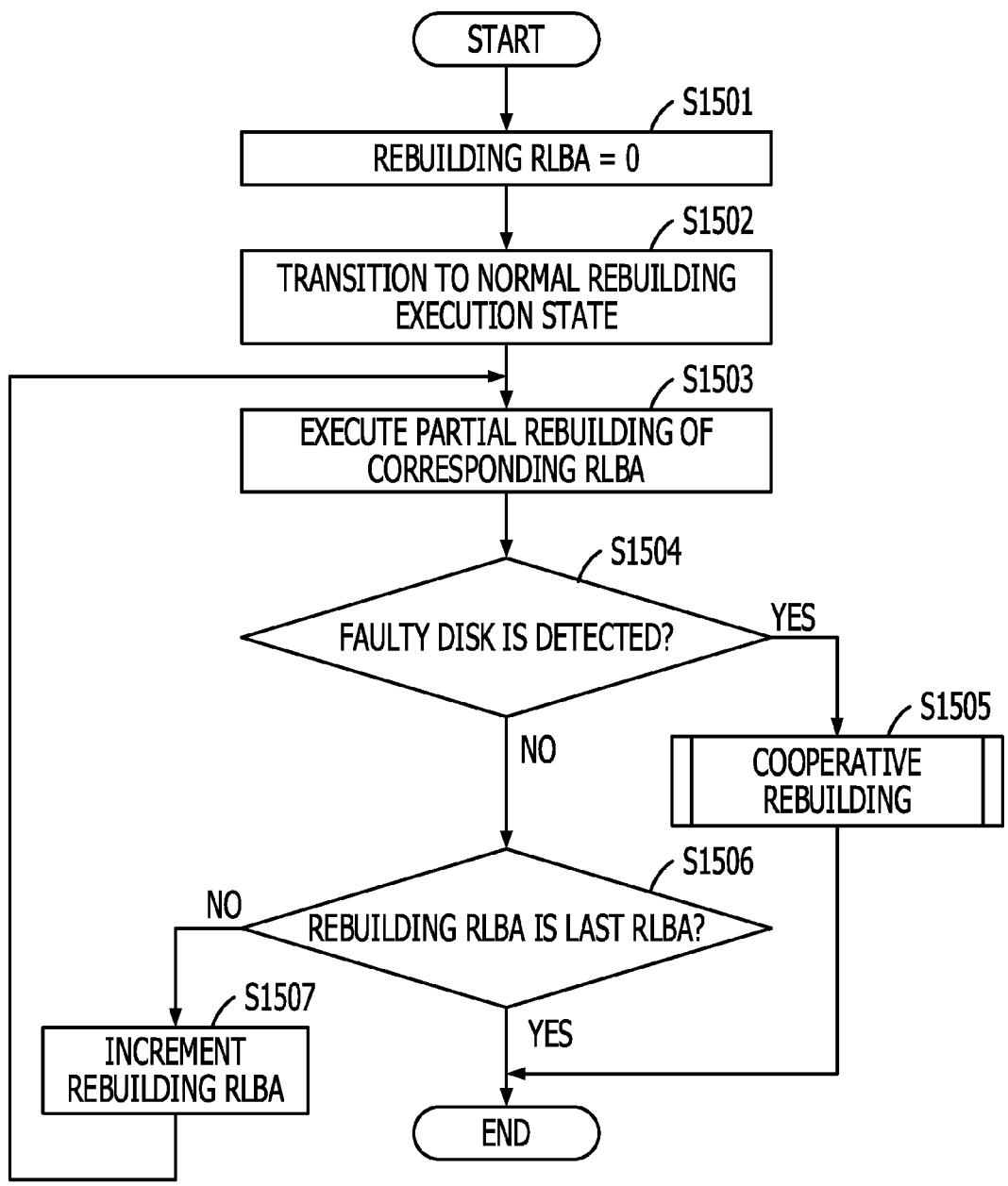
FIG. 15 is a flowchart illustrating an example of a procedure of normal rebuilding.

FIG. 15 is a flowchart illustrating an example of a procedure of normal rebuilding. Normal rebuilding is processing of recovering stored information of a degraded disk. The storage control device 101 sets the rebuilding RLBA to 0 (S1501). Subsequently, the state of the storage control device 101 transitions to the normal rebuilding execution state (S1502). Next, the storage control device 101 executes partial rebuilding of the RLBA (S1503). The partial rebuilding of the RLBA is the same as those described in S1204, and therefore, the description thereof will be omitted.

Next, the storage system 100 determines whether or not a faulty disk is detected (S1504). When a faulty disk is detected (YES in S1504), the storage system 100 executes cooperative rebuilding (S1505).

When a faulty disk is not detected (NO in S1504), the storage system 100 determines whether or not the rebuilding RLBA is the last RLBA (S1506). When the rebuilding RLBA is not the last RLBA (NO in S1506), the storage system 100 increments the rebuilding RLBA (S1507). When the rebuilding RLBA is the last RLBA (Yes in S1506), the storage system 100 ends the normal rebuilding. By executing normal rebuilding, the stored information of the degraded disk may be recovered.

Figure 16:
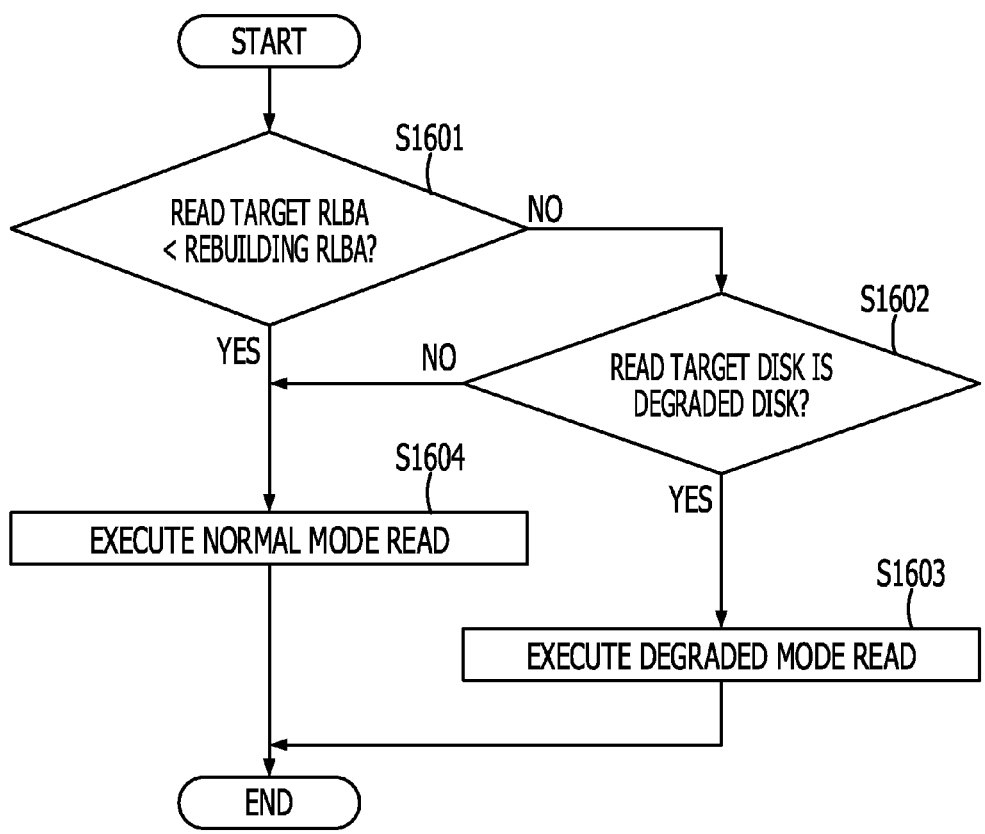
FIG. 16 is a flowchart illustrating an example of a procedure of read processing during normal rebuilding.

FIG. 16 is a flowchart illustrating an example of a procedure of read processing during normal rebuilding. Read processing during normal rebuilding is processing performed when a read request is issued while normal rebuilding is being executed.

When the storage control device 101 receives a read request, the storage control device 101 determines whether or not the read target RLBA is less than the rebuilding RLBA (S1601). When the read target RLBA is the rebuilding RLBA or more (NO in S1601), the storage control device 101 determines whether or not the read target disk is a degraded disk (S1602). When the read target disk is a degraded disk (YES in S1602), the storage control device 101 executes a degraded mode read (S1603).

When the read target disk is not a degraded disk (NO in S1602) or when the read target RLBA is less than the rebuilding RLBA (YES in S1601), the storage control device 101 executes a normal mode read (S1604). After the execution of S1603 or S1604 is ended, the storage control device 101 ends read processing during normal rebuilding. By executing the read processing during normal rebuilding, the storage system 100 may receive a read request to execute the read processing when normal rebuilding is executed. Note that write processing performed while normal rebuilding is being executed is the same as the write processing performed while differential rebuilding is being executed, and therefore, the description thereof will be omitted.

Figure 17:
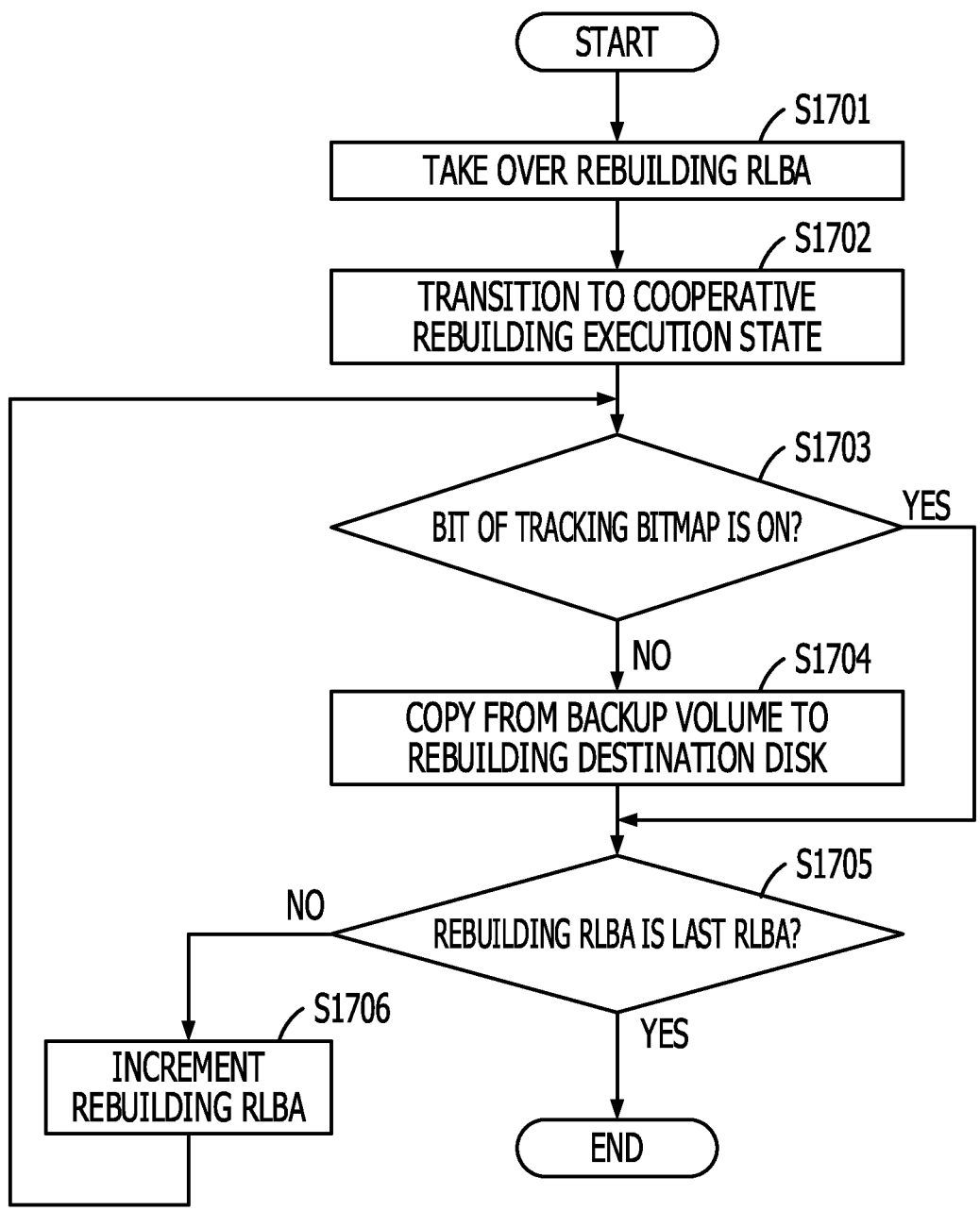
FIG. 17 is a flowchart illustrating an example of a procedure of cooperative rebuilding.

FIG. 17 is a flowchart illustrating an example of a procedure of cooperative rebuilding. The cooperative rebuilding is processing of recovering a RAID group using the backup volume 121 when the RAID group fails.

The storage control device 101 takes over the rebuilding RLBA from normal rebuilding (S1701). Then, the state of the storage control device 101 transitions to a cooperative rebuilding execution state (S1702). Subsequently, the storage control device 101 determines whether or not the bit of the tracking bitmap 122, corresponding to the RLBA, is on (S1703).

When the bit of the tracking bitmap 122, corresponding to the RLBA, is off, stored information corresponding to the bit is stored information which has not been updated since the last backup was performed by OPC. Therefore, when the bit of the tracking bitmap 122, corresponding to the RLBA, is off (NO in S1703), the storage control device 101 copies stored information from the backup volume 121 to a rebuilding destination disk (S1704).

When the bit of the tracking bitmap 122, corresponding to the RLBA, is on, stored information corresponding to the bit is stored information which has been updated in response to a write request after the last backup was performed by OPC. Therefore, when the bit of the tracking bitmap 122, corresponding to the RLBA, is on (YES in S1703), the storage control device 101 does not rewrite the stored information of the backup volume 121 and the processing of the storage control device 101 shifts to S1705.

After S1704 is ended, the storage control device 101 determines whether or not the rebuilding RLBA is the last RLBA (S1705). When the rebuilding RLBA is not the last RLBA (NO in S1705), the storage control device 101 increments the rebuilding RLBA (S1706). After S1706 is ended, the processing of the storage control device 101 shifts to S1703.

When the rebuilding RLBA is the last RLBA (YES in S1705), the storage control device 101 ends the cooperative rebuilding. Thus, the storage system 100 assumes that the entire recovery operation has been successfully completed, and ends the processing. By executing cooperative rebuilding, even when the RAID group fails, the RAID group may be recovered.

Figure 18:
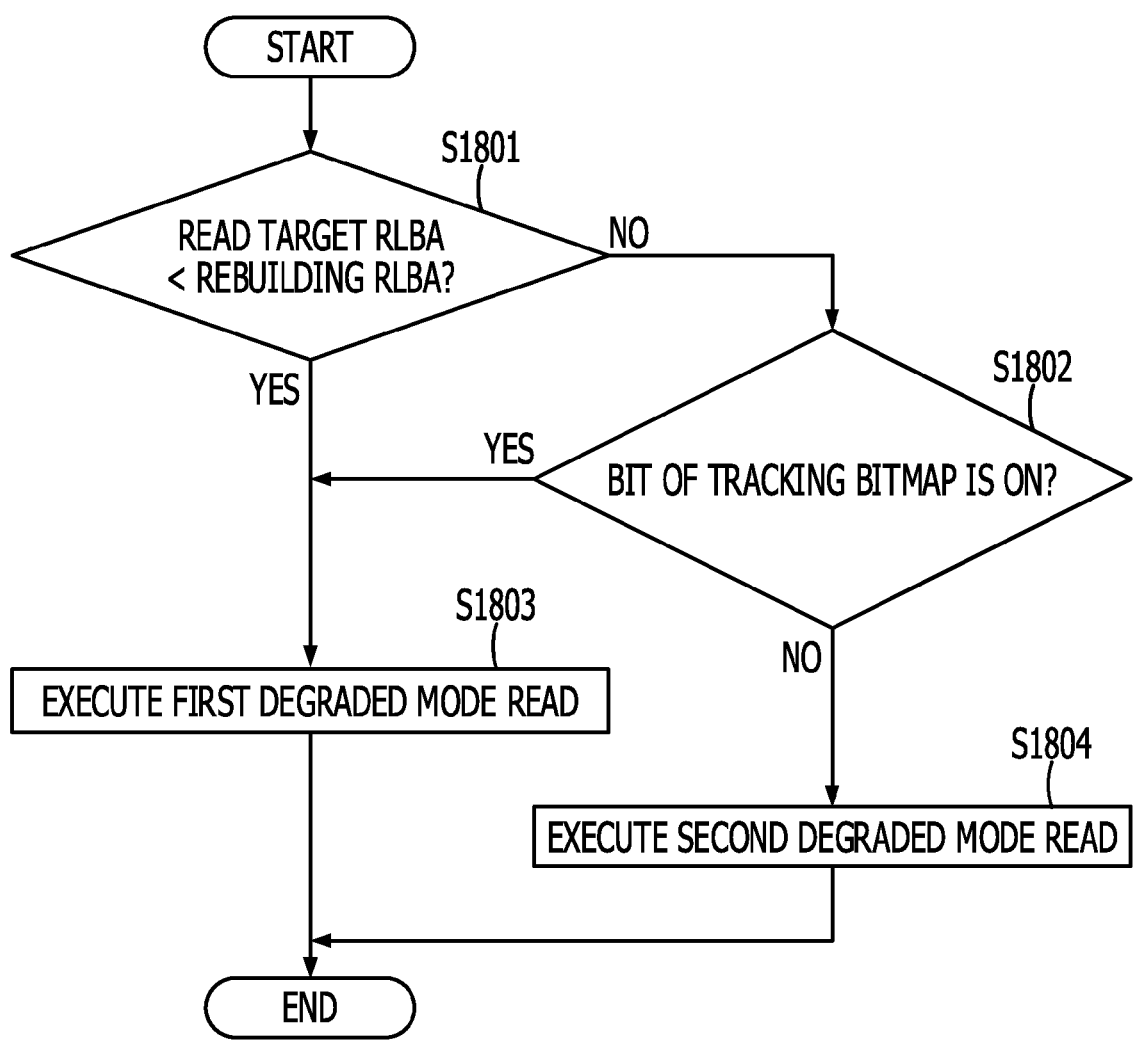
FIG. 18 is a flowchart illustrating an example of a procedure of read processing during cooperative rebuilding.

FIG. 18 is a flowchart illustrating an example of a procedure of read processing during cooperative rebuilding. Read processing during cooperative rebuilding is processing performed when a read request occurs while cooperative rebuilding is being executed.

When the storage control device 101 receives a read request, the storage control device 101 determines whether or not the read target RLBA is less than the rebuilding RLBA (S1801). When the read target RLBA is the rebuilding RLBA or more (NO in S1801), the storage control device 101 determines whether or not the bit of the tracking bitmap 122, corresponding to the read target RLBA, is on (S1802).

When the read target RLBA is less than the rebuilding RLBA (YES in S1801) or when the bit of the tracking bitmap 122, corresponding to the read target RLBA, is on (YES in S1802), the storage control device 101 executes the first degraded mode read illustrated in FIG. 9 (S1803). When the bit of the tracking bitmap 122, corresponding to the read target RLBA, is off (NO in S1802), the storage control device 101 executes the second degraded mode read illustrated in FIG. 10 (S1804). After S1803 or S1804 is executed, the storage control device 101 ends read processing during cooperative rebuilding. By executing read processing during cooperative rebuilding, the storage system 100 may receive a read request during cooperative rebuilding. Note that the storage control device 101 does not receive a write request while cooperative rebuilding is being executed.

As has been described, using the storage control device 101 according to this embodiment, an updated part which has been updated after RAID backup is stored and, when a disk fails, the updated part is restored. Then, when another disk fails, a part other than the updated part is restored from the backup. Thus, the redundancy of the updated part has been restored when the RAID group fails, and therefore, the storage control device 101 may recover the RAID group. That is, when the RAID group fails and restoration from a snapshot is performed, the storage control device 101 may perform, without losing data, restoration for the updated part which has been updated in response to a write request issued after a snapshot is generated. In recent years, as the storage disk capacity has increased, the time taken to perform rebuilding has increased, and thus, it is more likely that a failure occurs in another storage while rebuilding processing is being executed. Therefore, the usability of a method for controlling storages according to this embodiment is increased.

Normal rebuilding may be executed not by a method for controlling storages according to this embodiment but by some other method. When normal rebuilding performed by some other method is failed, the state of progress in the method might not be obtained by the method for controlling storages according to this embodiment. In this case, cooperative rebuilding may be performed from the rebuilding RLBA=0, using the method for controlling storages according to this embodiment. Thus, the storage system 100 may recover a failure of the RAID group.

Also, using the storage control device 101, when normal rebuilding is stopped, stored information which has not been restored by the normal rebuilding may be restored by cooperative rebuilding on the basis of information indicating the progress of the normal rebuilding. Thus, the storage control device 101 may perform restoration, when the RAID group fails, not by fully copying the stored information from a backup destination but by restoring only stored information which has not been restored. Thus, the time taken to restore stored information by cooperative rebuilding may be reduced. By reducing the time taken to restore stored information by cooperative rebuilding, the entire time taken to restore stored information by differential rebuilding, normal rebuilding, and cooperative rebuilding may be reduced.

Using the storage control device 101, write contents of a write request may be written, while differential rebuilding or normal rebuilding is being executed, in a storage region of a write destination designated by the write request in disks in which no failure has occurred and the HS 115. Thus, while differential rebuilding or normal rebuilding is being executed, the storage control device 101 may perform restoration without stopping the operation including write processing.

Also, using the storage control device 101, a read of stored information in a read destination of disks in which no failure has occurred and the HS 115 or a read of the stored information in the read destination of the backup volume 121 may be performed while restoration is being executed. Thus, the storage control device 101 may perform restoration without stopping the operation including read processing while any one of differential rebuilding, normal rebuilding, and cooperative rebuilding is being executed.

As has been described, even during restoration, a read request and a write request may be received while differential rebuilding or normal rebuilding is being executed, and thus, the storage control device 101 may perform restoration without stopping the operation including write processing and read processing. Also, even while cooperative rebuilding is being executed during the restoration, a read request may be received, and thus, the storage control device 101 may perform restoration without stopping the operation including only read processing, not write processing.

Using the storage control device 101, in the case where a read request is received while cooperative rebuilding is being executed, when stored information of a read destination designated by a read request is restored stored information, the storage control device 101 reads the stored information of the read destination in the HS 115. When the stored information of the read destination designated by the read request is not restored stored information, the storage control device 101 may read the stored information of the read destination from the backup volume 121. Thus, when stored information of a read destination designated by a read request issued while cooperative rebuilding is being executed is restored stored information, the storage control device 101 may access the stored information from the HS 115 which may be accessed fast, and the performance of the storage system 100 may be improved. Note that, as compared to access to its own RAID group, it might take more time to access to the backup volume 121, because the access to the backup volume 121 is made via the inter-storage-control-device communication path 203.

Using the storage control device 101, in the case where a read request is received while differential rebuilding is being executed, when stored information of a read destination designated by a read request is included in restored stored information, the stored information may be read from the HS 115. Thus, when stored information of a read destination designated by a read request while differential rebuilding is being executed is restored stored information, the storage control device 101 may access the stored information from the HS 115 which may be accessed fast, and the performance of the storage system 100 may be improved.

Using the storage control device 101, in the case where a read request is received while differential rebuilding is being executed, when a read target bit of the rebuilding bitmap 411 is off and a read target bit of the tracking bitmap 122 is on, stored information may be read from the HS 115. Thus, the storage control device 101 may access the stored information from the HS 115 which may be accessed fast, and the performance of the storage system 100 may be improved.

Note that the method for controlling storages described in this embodiment may be realized by causing a computer, such as a personal computer, a work station, and so forth, to execute a previously prepared program. The storage control program is recorded in a computer-readable recording medium, such as a hard disk, a flexible disk, a compact disc ROM (CD-ROM), a magnetooptic disc (MO), a digital versatile disk (DVD), and so forth, and is executed by causing a computer to read the program from the recording medium. Also, the storage control program may be distributed via a network, such as the Internet and so forth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device comprising:
a memory; and
a processor to
copy all pieces of first information stored in a first storage to a backup volume,
store management information in the memory when a first piece of the first information stored in the first storage is updated to second information after the copy, the management information including position information indicating a stored position, in the first storage, of the first piece of the first information, the first storage being included in a storage group in which redundancy is maintained, the storage group including a plurality of storages,
execute, when a first failure occurs in the first storage, first restoration on the basis of the management information stored in the memory and reference information stored in reference storages, the reference storages being the plurality of storages other than the first storage, the first restoration restoring the second information stored at the stored position in the first storage to a spare storage other than the plurality of storages,
execute second restoration on the basis of the management information stored in the memory and the reference information stored in the reference storages, the second restoration restoring third information to the spare storage, the third information being stored in the first storage and being other than the second information,
stop the second restoration when a second failure occurs in a second storage among the reference storages while the second restoration is being executed, and
execute third restoration on the basis of the first information stored in the backup volume and the management information stored in the memory, the third restoration restoring fourth information to the spare storage, the fourth information being stored in the first storage and being other than the second information.

2. The storage control device according to claim 1, wherein the processor executes the third restoration on the basis of progress information indicating progress of the second restoration, and
the fourth information is other than the third information.

3. The storage control device according to claim 1, wherein the processor
receives a write request while one of the first restoration and the second restoration is being executed, and
writes data specified in the write request to the spare storage and the reference storages, in a storage region designated by the write request.

4. The storage control device according to claim 1, wherein the processor
receives a read request while one of the first restoration, the second restoration, and the third restoration is being executed,
determines whether read target information stored in a storage region designated by the read request is restored information that has been restored by one of the first restoration, the second restoration, and the third restoration, and
executes, on the basis of a result of the determination, one of first read processing and second read processing, the first read processing reading the read target information from the spare storage and the reference storages, the second read processing reading the read target information from the backup volume.

5. The storage control device according to claim 4, wherein the processor executes, upon receiving the read request while the third restoration is being executed, the first read processing when it is determined that the read target information is the restored information, and the processor executes, upon receiving the read request while the third restoration is being executed, the second read processing when it is determined that the read target information is not the restored information.

6. The storage control device according to claim 4, wherein upon receiving the read request while the first restoration is being executed, the processor determines on the basis of the management information stored in the memory and progress information indicating progress of the first restoration, whether the read target information is first restored information that has been restored by the first restoration, the processor executes the first read processing when it is determined that the read target information is the first restored information, and the processor obtains, when it is determined that the read target information is not the first restored information, information identical with the read target information on the basis of the reference information stored in the reference storages.

7. The storage control device according to claim 4, wherein the processor determines, upon receiving the read request while the first restoration is being executed, whether three conditions including a first condition, a second condition, and a third condition are satisfied, the first condition is that progress information indicating progress of the first restoration indicates that the first restoration has not reached the storage region, the second condition is that the storage region is not indicated by the management information before the first restoration is started, the third condition is that the storage region is indicated by the management information after the first restoration is started, and the processor executes the first read processing when it is determined that the three conditions are satisfied.

8. The storage control device according to claim 1, further comprising:

a computer including the processor.

9. A method for controlling storages, the method comprising:

copying, by storage control device, all pieces of first information stored in a first storage to a backup volume;

storing management information in a memory when a first piece of the first information stored in the first storage is updated to second information after the copying, the management information including position information indicating a stored position, in the first storage, of the first piece of the first information, the first storage being included in a storage group in which redundancy is maintained, the storage group including a plurality of storages;

executing, when a first failure occurs in the first storage, first restoration on the basis of the management information stored in the memory and reference information stored in reference storages, the reference storages being the plurality of storages other than the first storage, the first restoration restoring the second information stored at the stored position in the first storage to a spare storage other than the plurality of storages;

executing second restoration on the basis of the management information stored in the memory and the reference information stored in the reference storages, the second restoration restoring third information to the spare storage, the third information being stored in the first storage and being other than the second information;

stopping the second restoration when a second failure occurs in a second storage among the reference storages while the second restoration is being executed; and executing third restoration on the basis of the first information stored in the backup volume and the management information stored in the memory, the third restoration restoring fourth information to the spare storage, the fourth information being stored in the first storage and being other than the second information.

10. A computer-readable recording medium storing a program that causes a computer to execute a procedure, the procedure comprising:

copying all pieces of first information stored in a first storage to a backup volume;

storing management information in a memory when a first piece of the first information stored in the first storage is updated to second information after the copying, the management information including position information indicating a stored position, in the first storage, of the first piece of the first information, the first storage being included in a storage group in which redundancy is maintained, the storage group including a plurality of storages;

executing, when a first failure occurs in the first storage, first restoration on the basis of the management information stored in the memory and reference information stored in reference storages, the reference storages being the plurality of storages other than the first storage, the first restoration restoring the second information stored at the stored position in the first storage to a spare storage other than the plurality of storages;

executing second restoration on the basis of the management information stored in the memory and the reference information stored in the reference storages, the second restoration restoring third information to the spare storage, the third information being stored in the first storage and being other than the second information;

stopping the second restoration when a second failure occurs in a second storage among the reference storages while the second restoration is being executed; and executing third restoration on the basis of the first information stored in the backup volume and the management information stored in the memory, the third restoration restoring fourth information to the spare storage, the fourth information being stored in the first storage and being other than the second information.

* * * * *